(12) United States Patent
Iwata et al.

(10) Patent No.: US 9,712,842 B2
(45) Date of Patent: Jul. 18, 2017

(54) VIDEO ENCODER AND OPERATION METHOD THEREOF

(71) Applicant: Renesas Electronics Corporation, Koutou-ku, Tokyo (JP)

(72) Inventors: Kenichi Iwata, Kanagawa (JP); Seiji Mochizuki, Kanagawa (JP); Toshiyuki Kaya, Kanagawa (JP); Ryoji Hashimoto, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/149,648

(22) Filed: May 9, 2016

(65) Prior Publication Data
US 2016/0255365 A1 Sep. 1, 2016

Related U.S. Application Data

(63) Continuation of application No. 14/324,117, filed on Jul. 4, 2014, now Pat. No. 9,363,527.

(30) Foreign Application Priority Data

Jul. 8, 2013 (JP) ................................ 2013-142364

(51) Int. Cl.
*H04B 1/66* (2006.01)
*H04N 19/513* (2014.01)
(Continued)

(52) U.S. Cl.
CPC ......... *H04N 19/521* (2014.11); *H04N 19/105* (2014.11); *H04N 19/167* (2014.11);
(Continued)

(58) Field of Classification Search
CPC .. H04N 19/521; H04N 19/105; H04N 19/167; H04N 19/174; H04N 19/436; H04N 19/51; H04N 19/55
See application file for complete search history.

(56) References Cited

U.S. PATENT DOCUMENTS 6,081,209 A * 6/2000 Schuyler ................. H03M 7/30
341/51
7,158,679 B2 1/2007 Sano et al.
(Continued)

FOREIGN PATENT DOCUMENTS

| JP | 2002-354501 A | 12/2002 |
| JP | 2004-032799 A | 1/2004 |
| JP | 2012-028863 A | 2/2012 |

OTHER PUBLICATIONS

Sullivan, G.J., et al., "Video Compression—From Concepts to the H.264/AVC Standard", Proceeding of the IEEE, vol. 93, No. 1, Jan. 2005.
(Continued)

*Primary Examiner* — Tat Chio
(74) *Attorney, Agent, or Firm* — Shapiro, Gabor and Rosenberger, PLLC

(57) ABSTRACT

To reduce noise or the like generated at a boundary of tiles introduced in a video coding method. In a motion vector detection unit, a first tile video signal and a second tile video signal included in one picture are supplied to a first detection unit and a second detection unit, and a reference image is supplied from a frame memory to the first detection unit and the second detection unit. The first detection unit performs processing, by inter prediction, on the video signal positioned on or in the vicinity of a tile boundary between a first tile and another tile among many video signals included in the first tile. In this processing, the first detection unit generates a motion vector so as to preferentially refer to the
(Continued)

reference image included in another tile different from the first tile among the reference images read out from the frame memory.

21 Claims, 13 Drawing Sheets

(51) Int. Cl.
*H04N 19/105* (2014.01)
*H04N 19/174* (2014.01)
*H04N 19/167* (2014.01)
*H04N 19/436* (2014.01)
*H04N 19/55* (2014.01)
*H04N 19/51* (2014.01)
*H04N 19/86* (2014.01)

(52) U.S. Cl.
CPC ......... *H04N 19/174* (2014.11); *H04N 19/436* (2014.11); *H04N 19/51* (2014.11); *H04N 19/55* (2014.11); *H04N 19/86* (2014.11)

(56) References Cited

U.S. PATENT DOCUMENTS

| | | | | |
|---|---|---|---|---|
| 8,411,749 | B1* | 4/2013 | Jacob | ...................... H04N 19/51 369/30.01 |
| 9,363,527 | B2* | 6/2016 | Iwata | ................... H04N 19/436 |
| 2012/0106652 | A1 | 5/2012 | Huang et al. | |
| 2013/0101035 | A1* | 4/2013 | Wang | ...................... H04N 19/70 375/240.12 |
| 2013/0136373 | A1 | 5/2013 | Sasai et al. | |
| 2013/0148734 | A1 | 6/2013 | Nakamura | |
| 2013/0343460 | A1* | 12/2013 | Itani | ................. H04N 19/00563 375/240.16 |
| 2014/0341549 | A1* | 11/2014 | Hattori | ................... H04N 19/70 386/354 |

OTHER PUBLICATIONS

Sullivan, G.J., et al., "Overview of the High Efficiency Video Coding (HEVC) Standard", IEEE Transactions on Circuits and Systems for Video Technology, vol. 22, No. 12, Dec. 2012.

Wu et al., "Motion-constrained tile sets SEI message", Joint Collaborative Team on Video Coding (JCT-VC) of ITU-T SG 16 WP 3 and ISO/IEC JTC 1/SC 29/WG 11, 13$^{th}$ Meeting: Incheon, KR, Apr. 18-26, 2013, pp. 1-4.

Extended European Search Report issued Nov. 11, 2014, in European Patent Application No. 14175656.9.

Wang, Ye-Kui, et al., "Flexible tile dependency and loop filtering control", Joint Collaborative Team on Video Coding (JCT-VC) of ITU-T SG16 WP3 and ISO/IEC JTC1/SC29/WG11, 8$^{th}$ Meeting: San Jose, CA, USA, Feb. 1-10, 2012.

Office Action issued Jul. 13, 2016, in European Patent Application No. 14 175 656.9.

* cited by examiner

VIDEO ENCODER AND OPERATION METHOD THEREOF

CROSS-REFERENCE TO RELATED APPLICATION

The disclosure of Japanese Patent Application No. 2013-142364 filed on Jul. 8, 2013 including the specification, drawings and abstract is incorporated herein by reference in its entirety.

BACKGROUND

The present invention relates to a video encoder and an operation method thereof, and in particular, relates to a technique effective for reducing noise or the like generated on a boundary of tiles introduced in a video coding method in order to enhancing parallel processing capability.

As known well, the general compression method of a video by the MPEG-2 standard which is standardized in the international standard ISO/IEC 13818-2 is based on the principle that video storage capacity and necessary band width are reduced by removing redundant information from a bit stream. Here, MPEG stands for Motion Picture Experts Group.

Since the MPEG-2 standard defines only a bit stream syntax (rule for a compressed coded data sequence or configuration method for a bit stream of the coded data) and a decoding process, the MPEG-2 standard is flexible so as to be utilized sufficiently well in various situations such as satellite broadcasting service, cable television, interactive television, and the internet.

In the coding process of MPEG-2, first, a video signal is sampled and quantized for defining a color component and a brightness component in each pixel of a digital video. The values indicating the color and brightness components are stored into a structure known as a macro block. The color and brightness values stored in the macro block are transformed into frequency values through the use of discrete cosine transform (DCT). A transform coefficient obtained by DCT has a different frequency between the brightness and the color of a picture. The quantized DCT transform coefficients are coded by variable length coding (VLC) which further compresses the video stream.

The MPEG-2 coding process defines an additional compression by a motion compression technique. In the MPEG-2 standard, three kinds of pictures or frames exist as I-frame, P-frame, and B-frame. I-frame is a frame subjected to intra-coding which means that the frame is reproduced without reference to any other pictures or frames in the video stream. P-frame and B-frame are frames subjected to inter-coding which means that the frame is reproduced with reference to the other pictures or frames. For example, each of P-frame and B frame includes a motion vector indicating motion estimation from a reference frame. Through the use of the motion vector, it becomes possible to reduce band width necessary for a specific video stream in an MPEG encoder. Meanwhile, I-frame is referred to as an intra-coded frame, P-frame is referred to as a predictive-coded frame, and B-frame is referred to as a bi-directionally predictive-coded frame.

Accordingly, a video encoder of MPEG-2 is constituted of a frame memory, a motion vector detection unit, a motion compensation unit, a subtraction unit, a DCT transform unit, a quantization unit, an inverse quantization unit, an inverse DCT transform unit, and a variable length coding unit. A video signal to be coded is read out from the frame memory after having been stored in the frame memory for coding and motion vector detection of B-frame, a compensation prediction signal from the motion compensation unit is subtracted in the subtraction unit, and DCT transform processing and quantization processing are executed in the DCT transform unit and the quantization unit, respectively. The quantized DCT transform coefficients are subjected to variable length coding processing in the variable length coding unit, and also subjected to local decoding processing in the inverse quantization unit and the inverse DCT transform unit, and then the result of this local decoding processing is supplied to the subtraction unit via the motion compensation unit.

On the other hand, a video decoder is constituted of a buffer memory, a variable length decoding unit, an inverse quantization unit, an inverse DCT transform unit, a motion compensation unit, an addition unit, and a frame memory. The MPEG-2 coded bit stream, after having been stored in the buffer memory, is subjected to variable length decoding processing, the inverse quantization processing, and the inverse DCT transform processing in the variable length decoding unit, the inverse quantization unit, and the inverse DCT transform unit, respectively, and then the motion vector which has been subjected to the variable length decoding processing is added in the addition unit and a reproduced image signal is generated from the output of the addition unit. This reproduced image signal is stored into the frame memory and is used for prediction of the other frames.

Following the MPEG-2 standard, there has also been proposed a general video compression method by the MPEG-4 standard (H.263) standardized in the international standard ISO/IEC 14496 for low-rate coding in a TV telephone and the like. The compression method by the MPEG-4 (H.263) standard is a compression method referred to as a "hybrid type" using the inter frame prediction and the discrete cosine transform in the same way as in MPEG-2, and further introduces motion compensation in a unit of a half pixel (half-pel). This compression method, while using a Huffman code for entropy coding in the same way in MPEG-2, newly introduces a technique of a three-dimensional variable length coding (three-dimensional VLC) which codes run, level, and last at the same Lime, and enhances a compression rate considerably. Here, run and level relate to run length coefficients and last indicates the last coefficient. Moreover, the MPEG-4 (H.263) standard includes a basic part referred to as Baseline and an extended standard referred to as Annex.

Because of an insufficient efficiency improvement in the compression method in accordance with the MPEG-4 (H.263) standard, the MPEG-4 AVC (H.264) standard was standardized by the international standard ISO/IEC 14496-10 for achieving a higher coding efficiency without consideration of compatibility with the existing methods. Meanwhile, AVC stands for Advanced Video Coding, and the MPEG-4 AVC (H.264) standard is referred to as H.264/AVC.

Video coding by the standard H.264/AVC is constituted of a video coding layer and a network abstraction layer. That is, the video coding layer is designed so as to cause a video context to be expressed effectively, and the network abstraction layer formats video VCL expression and also provides, by an appropriate method, header information for transport by various transport layers and recording media.

In the international standard video coding method such as MPEG-2, MPEG-4, and MPEG-4 AVC (H.264), the inter coding, that is, inter-frame prediction coding is used for realizing a high coding efficiency by using correlation in the time direction. Frame coding modes include I-frame using intra-coding without using correlation between the frames, P-frame which is inter-predicted from I-frames coded in the past, and B-frame which can be inter-predicted from two frames coded in the past.

In this inter-frame prediction coding, a reference image (prediction image) subjected to motion compensation is subtracted from a video, and a residual error in this subtraction is coded. Coding processing includes processing of orthogonal transform such as the DCT (discrete cosine transform), the quantization, and the variable length coding. Motion compensation (motion correction) includes processing of spatially moving a reference frame of the inter-frame prediction, and the motion compensation processing is performed in a block unit of the frame to be coded. When image contents do not include motion, the movement is not necessary and a pixel at the same position as a pixel to be predicted is used. When motion exists, a block having the largest similarity is searched for and a movement amount is defined as a motion vector. The block for the motion compensation is a block of 16 pixels×16 pixels/16 pixels×8 pixels in the MPEG-2 coding method, and a block of 16 pixels×16 pixels/16 pixels×8 pixels/8 pixels×8 pixels in the MPEG-4 coding method. In the MPEG-4 AVC (H.264) coding method, the motion compensation block is a block of 16 pixels×16 pixels/16 pixels×8 pixels/8 pixels×16 pixels/8 pixels×8 pixels/8 pixels×4 pixels/4 pixels×8 pixels/4 pixels×4 pixels.

The above-described coding processing is performed for each picture screen (frame or field), and a block (normally, 16 pixels×16 pixels, referred to as a macro-block (MB) in MPEG) obtained by segmentalizing the screen is a processing unit. That is, for each of the blocks to be coded, the most similar block (prediction image) is selected from the already coded reference image, and a differential signal of the coding image (block) and the prediction image is subjected to the coding (orthogonal transform, quantization, or the like). A relative position difference between the block to be coded and a prediction signal in the screen is referred to as the motion vector.

Furthermore, non-patent literature 1 (Gary J. Sullivan et al., "Video Compression—From Concept to the H.264/AVC Standard", Proceeding of the IEEE, vol. 93, no. 1, January 2005, pp. 18-31) describes that the video coding layer (VCL) by H.264/AVC follows an approach referred to as block-based hybrid video coding. VCL is constituted of a macro-block, a slice, and a slice-block, and each picture is divided into a plurality of macro-blocks having a fixed size, each of the macro-block includes a rectangular picture area of 16×16 samples for a brightness component and a rectangular sample area for each of the corresponding two color difference components. A picture may contain one or more slices. Each slice is self-contained, in the sense that, given the active sequence and picture parameter sets, its syntax elements can be parsed from the bitstream and the values of the samples in the area of the picture that the slice represents can basically be decoded without use of data from other slices of the picture. However, for completely exact decoding, some information from other slices may be needed in order to apply the deblocking filter across slice boundaries. In addition, it is also described in non-patent literature 1 that, since each of the slices is coded and decoded independently of the other slices of the picture, the slice can be used for parallel processing.

Meanwhile, the image size in a system treating a video code is being increased in HDTV (High Definition Television) broadcasting equipment, a digital video camera capable of capturing a HDTV signal, and the like. A still higher processing capability is required for an image encoder and an image decoder, processing such a signal.

From such a background, a new standard H.265 (ISO/IEC 23008-2) which is a standard succeeding the standard H.264/MPEG-4 AVC has been proposed, and this new standard is called HEVC (High Efficiency Video Coding). This new standard is excellent in compression efficiency by appropriation and the like of the block size, and is considered to have a compression capability approximately 4 times higher than the MPEG-2 standard and approximately 2 times higher than the standard H.264/AVC.

Meanwhile, patent literature 1 (US Patent Application Publication No. US2012/0106652A1 Specification) describes that, while one macro-block configured with 16×16 pixels is used as a processing unit for the motion compensation and the subsequent processing in various widely-employed coding compression standards such as MPEG-1/2/4 and H.261/H.263/H.264-AVC, a more flexible block structure is adopted as a processing unit in the next generation standard called HEVC. The unit of this flexible block structure is referred to as a coding unit (CU), the coding unit starts with the largest coding unit (LCU) and divided adaptively into smaller blocks through the use of a quadtree for achieving a better performance. The size of the largest coding unit (LCU) is 64×64 pixels which is far larger than the micro-block size of 16×16 pixels. FIG. 1 and the disclosure relating FIG. 1 of patent literature 1 show an example of the coding unit division based on the quadtree, and, at a depth "zero" thereof, the initial coding unit (CU) is the largest coding unit (LCU) constituted of 64×64 pixels. While split flag "0" shows that the underlying coding unit (CU) is not divided, split flag "1" shows that the underlying coding unit (CU) is divided into four smaller coding units by the quadtree. It is also described in patent literature 1 that the coding unit (CU) after the division is further divided by the quadtree until the size of a preliminarily specified smallest coding unit (CU) is reached.

The outline of the standard HEVC is described in non-patent literature 2 (Gary J. Sullivan et al., "Overview of the High Efficiency Video Coding (HEVC) Standard", IEEE Transactions on Circuits and Systems for Video Technology, vol. 22, no, 12, December 2012, pp. 1649-1668). While the core of the coding layer in the previous standards is the macro-block including a 16×16 block of the brightness sample and two 8×8 blocks of the chromaticity samples, an analogous structure in the HEVC standard is a coding tree unit (CTU) which has a size selected by the encoder and can be larger than the traditional macro-block. The coding tree unit (CTU) is constituted of a brightness coding tree block (CTB) and a chromaticity coding block (CTB), and syntax elements. A quad-tree syntax of the coding tree unit (CTU) specifies the sizes and positions of the coding tree blocks (CTB) of the brightness and the chromaticity. The determination whether an inter-picture or an intra-picture is used for coding a picture area is made at the level of the coding unit (CU). A dividing structure of a prediction unit (PU) has the root thereof at the level of the coding unit (CU). Depending on the determination of a basic prediction type, the brightness and chromaticity coding blocks (CB) can be divided in size, and can be predicted from the brightness and chromaticity prediction blocks (PB). The HEVC standard supports variable prediction block (PB) sizes from 64×64 samples down to 4×4 samples. A prediction error is coded by block transform, and a tree structure of a transform unit (TU) has the root thereof at the level of the coding unit (CU). A residual error of the brightness coding block (CB) is identical to the brightness transform block (TB), and can be further divided into smaller brightness transform blocks (TB). The same applies to the chromaticity transform block (TB). Integer-basis functions similar to those of a discrete cosine transform (DCT) function are defined for rectangular transform blocks (TB) of 4×4, 8×8, 16×16, and 32×32 samples.

In addition, non-patent literature 2 describes that a slice in the HEVC standard is a data structure which can be coded independently of the other slices in the same picture. Furthermore, non-patent literature 2 describes that new features of a tile and wave front parallel processing (WPP) are introduced in the HEVC standard for modifying the slice data structure in order to enhance the parallel processing capability or to perform packetizing. The tile divides a picture into rectangular areas, and a main purpose of the tile is to enhance the parallel processing capability rather than to provide resilience of the error. Plural tiles are areas where one picture can be decoded independently, and coded by common header information. By the wave front parallel processing (WPP), one slice is divided into a plurality of rows of the coding tree units (CTU). The first row is processed by a normal way, the second row can start to be processed after some determination of the first row has been made, and the third row can start to be processed after some determination of the second row has been made.

Furthermore, non-patent literature 2 describes a configuration of a hybrid video encoder capable of generating a bit stream complying with the HEVC standard, and also describes that a de-blocking filter similar to the one used in the H.264/MPEG-4 AVC standard is included in an inter-picture prediction loop thereof.

SUMMARY

In advance of the invention, present inventors and others have been working on the development of a video encoder capable of generating a coded bit stream by coding a video in accordance with a new standard H.265 (HEVC).

In this development, in advance of the invention, first the present inventors and others reviewed the existing video coding method and a new standard H.265 (HEVC) coding method.

First, in the existing video coding methods of MPEG-2/4, H.263, and the like, when a video is coded at a low bit rate, there has been a problem in which a decoded image is stored into a frame memory while keeping block distortion, and coding in motion compensation processing of the next picture is performed with reference to the decoded image including this block distortion, and thus degradation of image quality is propagated.

Accordingly, in the video coding method by the standard H.264/AVC, before the storage of the decoded image into the frame memory, removal of the block distortion is performed by a de-blocking filter. This de-blocking filter is a filter reducing the block distortion generated in the image coding. Accordingly, through the use of the de-blocking filter, the block distortion is prevented from being included in the reference image and being propagated to the decoded image, and thus it becomes possible to reproduce the decoded image having a preferable image quality. However, image processing amount in the de-blocking filter is huge and there is a case where approximately a half of the total processing amounts of a video decoder is occupied by the image processing amount of the de-blocking filter. Accordingly, the following three kinds of setting are available through the use of two parameters; a de-blocking filter control present flag which is included in a picture parameter set for a bit stream, and disable de-blocking filter idc which is included in a slice header.

A first one executes de-blocking processing for a block boundary and a macro-block boundary, a second one executes the de-blocking processing only for the macro-block boundary, and a third one does not execute the de-blocking processing. For example, when the decoding processing is executed by a power-saving system LSI as in a mobile phone and the like, reduction of the processing amount is realized while slight image degradation is to be allowed by omission of the de-blocking processing.

In contrast, as described in above non-patent literature 2, parallel processing become possible in the video encoder executing the video coding processing and the video decoder executing the video decoding processing, through the use of the tile for enhancing the parallel processing capability, introduced in the video coding method of the standard H.265 (HEVC). Since a recent system LSI employs a dual-core or quad-core computer architecture, the use of the tile for enhancing the parallel processing capability is effective.

However, in the study in advance of the invention, the present inventors and others have found a problem in which discontinuous noise or the like is generated at the tile boundary through the use of the tile for enhancing the parallel processing capability, introduced in the video coding method of the standard H.265 (HEVC) and thus the image degradation is caused.

In the study in advance of the invention, the present inventors and others have found that the de-blocking filter of a hybrid video encoder capable of generating the bit stream in accordance with the HEVC standard described in the above non-patent literature 2 can reduce the above described discontinuous noise or the like at the tile boundary to some extent but cannot reduce the noise sufficiently.

Means for solving such a problem and the like will be explained in the following, and the other problems and new features will become clear from the description of the present specification and the accompanying drawings.

The following explains briefly the outline of a representative embodiment disclosed in the present application.

That is, in a video encoder (1) according to a representative embodiment, a motion vector detection unit (109) executing motion vector detection includes at least a first motion vector detection unit (109_1) and a second motion vector detection unit (109_2).

A video signal of a first tile and the video signal of a second tile included in one picture of the video signal (VS) are supplied respectively to one input terminal of the first motion vector detection unit (109_1) and one input terminal of the second motion vector detection unit (109_2).

A reference image read out from a frame memory (108) is supplied to the other input terminal of the first motion vector detection unit (109_1) and the other input terminal of the second motion vector detection unit (109_2).

The first motion vector detection unit (109_1) executes first tile boundary processing which processes, by inter prediction, the video signal positioned on or in the vicinity of the tile boundary between the first tile and another tile among the many video signals included in the first tile.

When executing the first tile boundary processing, the first motion vector detection unit (109_1) generates a first motion vector so as to preferentially refer to the reference image included in another tile different from the first tile among the reference images read out from the frame memory.

The second motion vector detection unit (109_2) executes second tile processing which processes, by the inter prediction, the video signal positioned on or in the vicinity of the tile boundary between the second tile and another tile among the many video signals included in the second tile.

When executing the second tile boundary processing, the second motion vector detection unit (109_2) generates a second motion vector so as to referentially refer to the reference image included in another tile different from the second tile among the reference images readout from the frame memory (refer to FIG. 2).

There will be briefly explained an effect obtained by representative one of embodiments disclosed in the present application, as follows.

That is, according to the present video encoder (1), it is possible to reduce noise or the like generated at the tile boundary.

DETAILED DESCRIPTION

1. Outline of Embodiments

Figure 1:
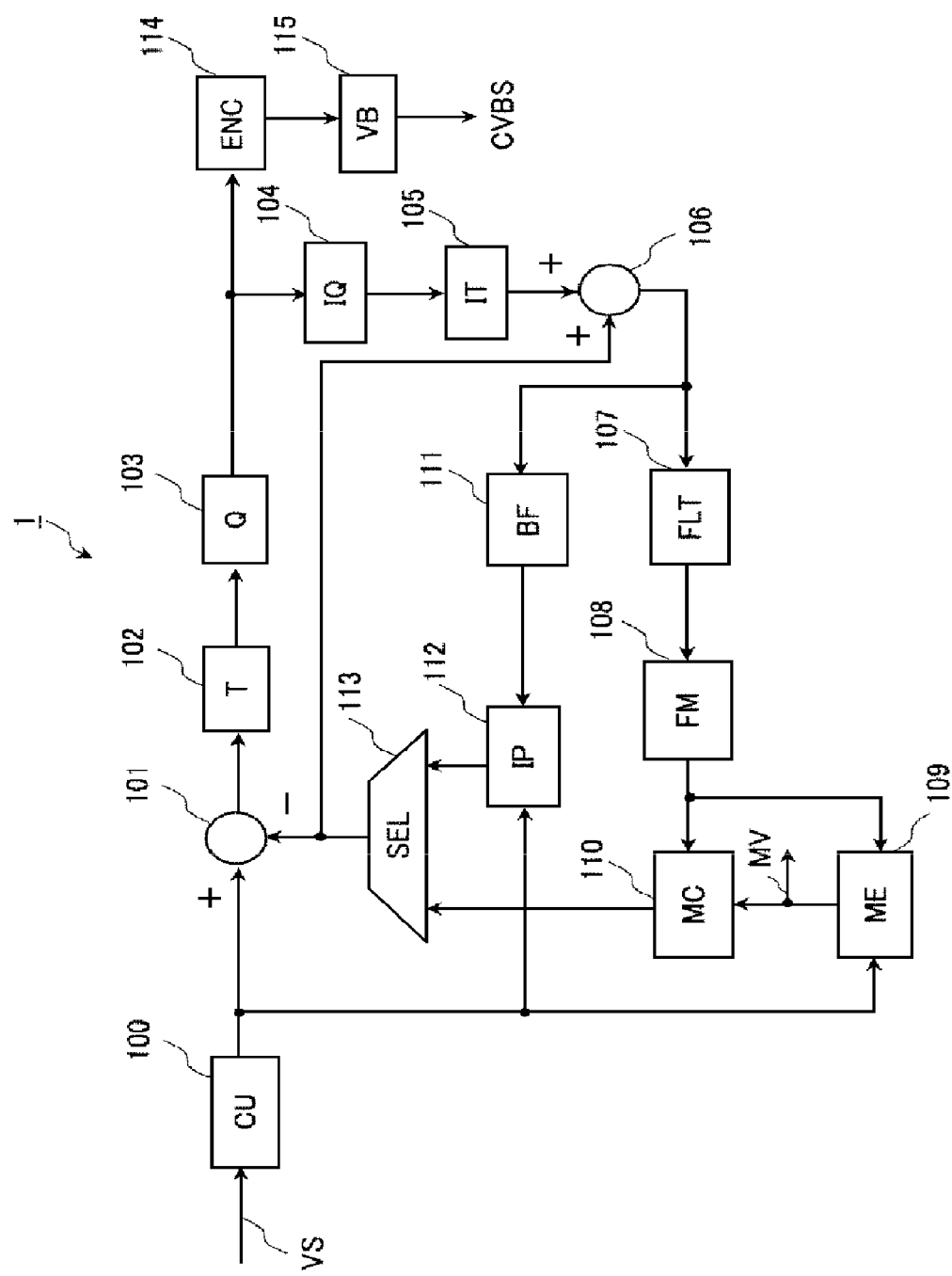
FIG. 1 is a diagram showing a configuration of a video encoder 1 according to a first embodiment.

First, there will be explained outlines of representative embodiments disclosed in the present application. A reference sign with a parenthesis in the drawings to be referred to in the explanation for the outlines of the representative embodiments, simply illustrates contents included in the concept of a constituent to which the reference sign is attached.

As a representative embodiment, in a video encoder (1), a motion vector is generated by searching for, by motion vector detection (109), a reference image area most similar to a coding image area (PU) of a video signal (VS) to be coded, with a reference image read out from a frame memory (108).

A motion compensation prediction signal is generated by motion compensation (110) from the motion vector and the reference image read out from the frame memory (108).

A residual error is generated by subtraction (101) of the video signal (VS) and the motion compensation prediction signal.

The reference image to be stored into the frame memory (108) is generated by addition (106) of processing results of transform processing (102), quantization processing (103), inverse quantization processing (104), and inverse transform processing (105) of the prediction residual error generated by the subtraction (101), and the motion compensation prediction signal generated by the motion compensation (110) (refer to FIG. 1).

A mot ion vector detection unit (109) executing the motion vector detection includes at least a first motion vector detection unit (109_1) and a second motion vector detection unit (109_2).

The video signal of a first tile and the video signal of a second tile included in one picture of the video signal (VS) are supplied respectively to one input terminal of the first motion vector detection unit (109_1) and one input terminal of the second motion vector detection unit (109_2).

The reference image readout from the frame memory (108) is supplied to the other input terminal of the first motion vector detection unit (109_1) and the other input terminal of the second motion vector detection unit (109_2).

A first motion vector (MV1) and a second motion vector (MV2) are generated in parallel from an output terminal of the first motion vector detection unit (109_1) and an output terminal of the second motion vector detection unit (109_2).

A motion compensation unit (110) executing the motion compensation includes at least a first motion compensation unit (110_1) and a second motion compensation unit (110_2).

The first motion vector (MV1) and the second motion vector (MV2) are supplied respectively to one input terminal of the first motion compensation unit (110_1) and one input terminal of the second motion compensation unit (110_2).

The reference image readout from the frame memory (108) is supplied to the other input terminal of the first motion compensation unit (110_1) and the other input of the second motion compensation unit (110_2).

A first motion compensation prediction signal and a second motion compensation prediction signal are generated in parallel as the motion compensation prediction signal from an output terminal of the first motion compensation unit (110_1) and an output terminal of the second motion compensation unit (110_2).

The first motion vector detection unit (109_1) executes first tile boundary processing which performs processing, by inter prediction, on the video signal positioned on or in the vicinity of a tile boundary between the first tile and another tile among the many video signals included in the first tile.

The first motion vector detection unit (109_1) generates the first motion vector so as to preferentially refer to a reference image included in another tile which is different from the first tile among the reference images readout from the frame memory, when the first tile boundary processing is executed.

The second motion vector detection unit (109_2) executes second tile processing which performs processing, by inter prediction, on the video signal positioned on or in the vicinity of the tile boundary between the second tile and another tile among many video signals included in the second tile.

The second motion vector detection unit (109_2) generates the second motion vector so as to preferentially refer to a reference image included in another tile which is different from the second tile among the reference images read out from the frame memory (refer to FIG. 2), when the second tile boundary processing is executed.

According to the above-described embodiment, it is possible to reduce noise or the like generated at the tile boundary.

In a preferable embodiment, the first motion vector detection unit generates the first motion vector according to the address information of the video signal in the first tile and the address information of the reference image supplied respectively to the one input terminal and the other input terminal of the first motion vector detection unit, and the information about the tile boundary.

Figure 3:
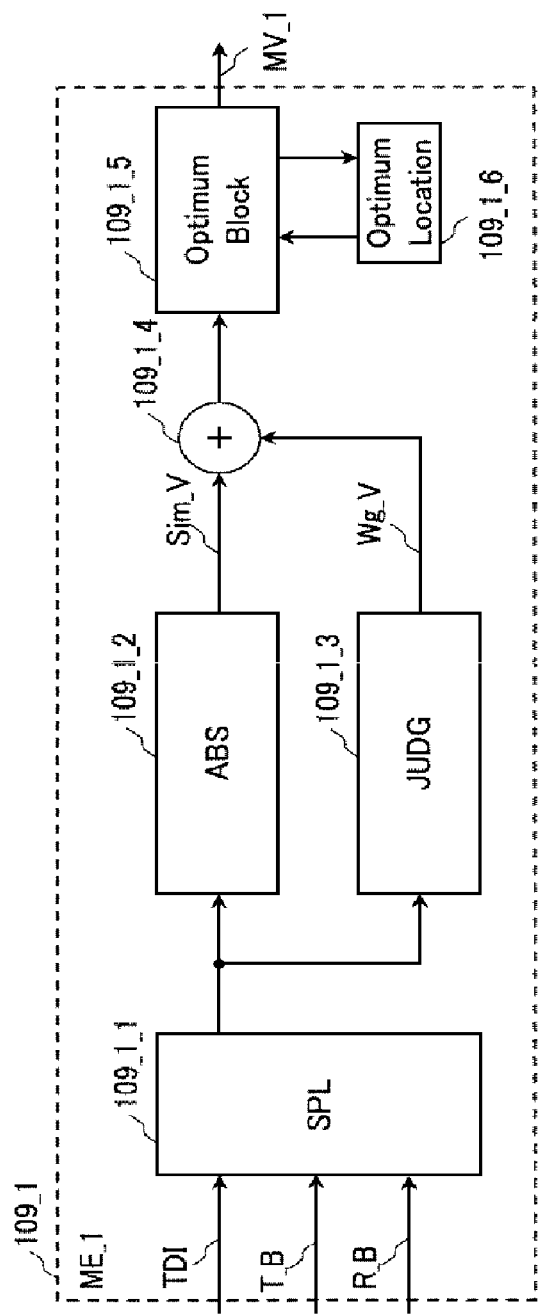
FIG. 3 is a diagram showing a configuration of a first motion vector detection unit 109_1 in the motion vector detection unit 109 shown in FIG. 2 according to a first embodiment.

The second motion vector detection unit generates the second motion vector according to the address information of the video signal in the second tile and the address information of the reference image supplied respectively to the one input terminal and the other input terminal of the second motion vector detection unit, and the information about the tile boundary (refer to FIG. 3).

In another preferable embodiment, each of the first motion vector detection unit (109_1) and the second motion vector detection unit (109_2) is configured to be capable of generating the first motion vector (MV1) and the second motion vector (MV2) in a fractional pixel accuracy by using an interpolation filter having a plurality of taps, executing interpolation of a pixel value between integer pixel positions (refer to FIG. 9 to FIG. 13).

In still another preferable embodiment, the first motion vector detection unit (109_1) is capable of causing a fractional search area which is set in the fractional pixel accuracy for the motion vector detection (109) to include the reference image which is included in the another tile different from the first tile, when the first motion vector is generated.

Figure 12:
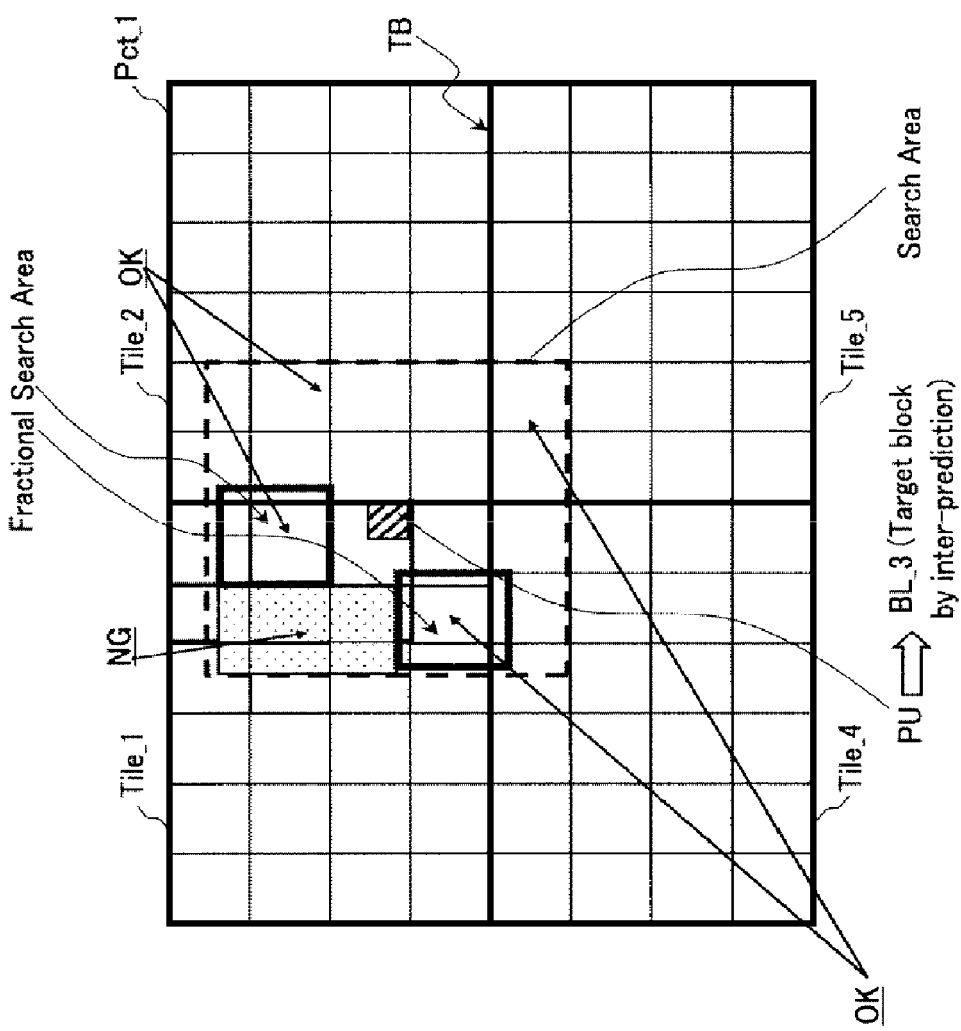
FIG. 12 is a diagram showing a fractional search area Fractional Search Area where a search is possible using a pixel value at a fractional pixel accuracy position generated by the interpolation filter shown in FIG. 9 according to a second embodiment when a prediction unit (PU) of a coding target is a block BL3 positioned on a tile boundary line TB as in FIG. 7.

The second motion vector detection unit (109_2) is capable of causing the fractional search area which is set in the fractional pixel accuracy for the motion vector detection (109) to include the reference image included in the another tile which is different from the second tile, when the second motion vector is generated (refer to FIG. 12).

In a specific embodiment, the video signal in the first tile and the video signal in the second tile supplied respectively to the one input terminal of the first motion vector detection unit and the one input terminal of the second motion vector detection unit are the video signals of a plurality of tiles divided in accordance with a standard H.265 (HEVC).

Furthermore, in the specific embodiment, each of the vicinity of the tile boundary processed by the first tile boundary processing or the second tile boundary processing is positioned on the tile boundary at a smaller distance than a largest coding-unit (LCU) which is defined by standard H.265 (HEVC) and has a size of 64×64 pixels.

2. Details of Embodiments

Next, embodiments will be described further in detail. Meanwhile, in all the drawings for explaining preferable embodiments for executing the invention, the same sign is attached to a component having the same function as one in the previously described drawings and repeated explanation will be omitted.

[First Embodiment]

<<Configuration of a Video Encoder>>

FIG. 1 is a diagram showing a configuration of a video encoder 1 according to a first embodiment.

The video encoder 1 shown in FIG. 1 according to the first embodiment is constituted of a coding unit buffer 100, a subtracter 101, a frequency transform unit 102, a quantization unit 103, an inverse quantization unit 104, an inverse frequency transform unit 105, and an adder 106. Furthermore, the video encoder 1 is constituted of a filter unit 107, a frame memory 108, a motion vector detection unit 109, a motion compensation unit 110, a buffer memory 111, an intra prediction unit 112, a selector 113, an entropy encoder 114, and a video buffer 115.

The video signal VS is divided into coding units (CU) of processing units, having a flexible block structure of the HEVC standard, and then the coding units (CU) are stored into the coding unit buffer 100. The coding unit (CU) read out from the coding unit buffer 100 is supplied to one input terminal of the subtracter 101, one input terminal of the motion vector detection unit 109, and one input terminal of the intra prediction unit 112.

While not shown in the drawing, a prediction mode indicating inter prediction or intra prediction for each picture of a video is supplied to the selector unit 113 and the entropy encoder 114 from a coding control unit which is not shown in the drawing. The coding unit (CU) of the video signal to be subjected to inter coding is stored into the buffer 100 for B frame coding and the motion vector detection, and then the coding unit (CU) read out from the buffer 100 is supplied to one input terminal of the subtracter 101. The motion vector detection unit 109 generates the motion vector MV in response to the video signal read out from the buffer 100 and the reference image stored in the frame memory 108, and the motion compensation unit 110 generates the motion compensation prediction signal in response to the motion vector generated in the motion vector detection unit 109 and the reference image stored in the frame memory 108. The motion compensation prediction signal from the motion compensation unit 110 is subtracted from the video signal in the subtracter 101 via the selector unit 113, and the frequency transform processing and the quantization processing are executed in relation to a subtraction output signal from the subtracter 101 in the frequency transform unit 102 and the quantization unit 103, respectively. A frequency transform coefficient quantized in the quantization unit 103 and the motion vector MV generated in the motion vector detection unit 109 are subjected to variable length coding processing in the entropy encoder 114, and a compressed video bit stream CVBS is generated via the video buffer 115. The frequency transform coefficient quantized in the quantization unit 103 is subjected to local decoding processing by the inverse quantization unit 104, the inverse frequency transform unit 105, the adder 106 and the filter unit 107, and then this local decoding processing result is stored in the frame memory 108 as the reference image. The filter unit 107 has a function of a de-blocking filter for reducing block distortion in accordance with the MPEG-4 AVC (H.264) standard. Furthermore, the filter unit 107 has a filter function referred to as sample adaptive offset (SAO) after the de-blocking filter function for complying with the new standard H.265 (HEVC). This sample adaptive offset (SAO) filter function reconstructs an original signal amplitude preferably by using a look-up table described with an additional parameter which is determined by frequency distribution analysis of the coding control unit, not shown in the drawing, in the video encoder 1.

The video signal to be subjected to the intra coding is stored into the buffer 100, and then the video signal read out from the buffer 100 is supplied to one input terminal of the intra prediction unit 112. On the other hand, since the reference image which has been coded by the intra prediction and has been decoded by the local decoding processing is stored in the buffer memory 111, the reference image read out from the buffer memory 111 is supplied to the other input terminal of the intra prediction unit 112. Accordingly, when performing the intra coding on the coding unit (CU) of the video signal supplied to one input terminal, the intra prediction unit 112 selects the optimum coding unit from a plurality of nearby coding units (CU) which are included in the already coded reference image supplied to the other input terminal from the buffer memory 111, and further generates spatial information of the selected optimum coding unit. As a result, the intra prediction unit 112 supplies intra prediction information including the intra-predicted optimum coding unit (CU) and a corresponding spatial prediction mode to the selector unit 113.

<<Configurations of the Motion Vector Detection Unit and the Motion Compensation Unit>>

Figure 2:
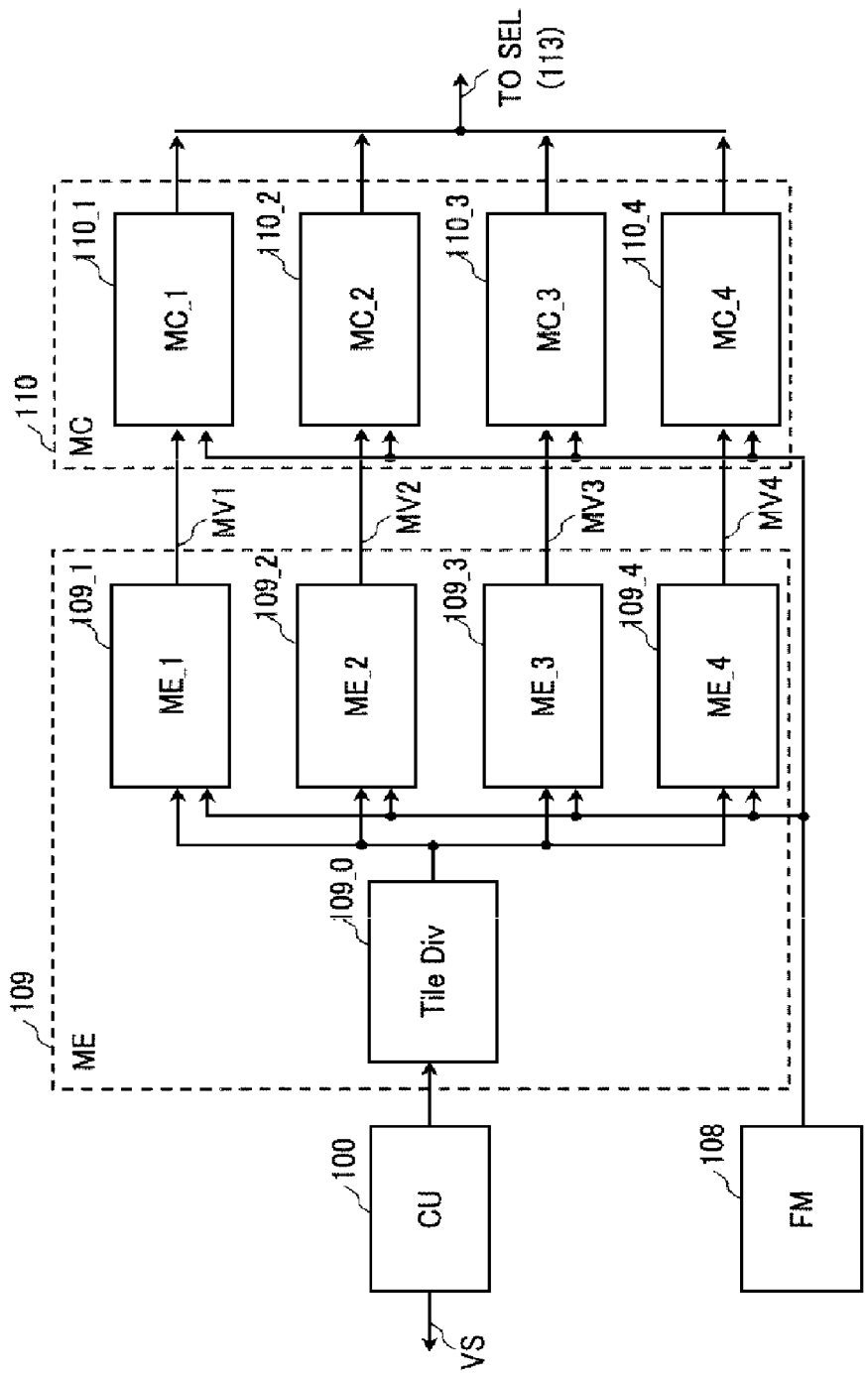
FIG. 2 is a diagram showing configurations of a motion vector detection unit 109 and a motion compensation unit 110 in the video encoder 1 shown FIG. 1 according to a first embodiment.

FIG. 2 is a diagram showing configurations of the motion vector detection unit 109 and the motion compensation unit 110 in the video encoder 1 shown in FIG. 1 according to the first embodiment.

As shown in FIG. 2, the motion vector detection unit 109 includes a tile dividing unit 109_0, a first motion vector detection unit 109_1 and a second motion vector detection unit 109_2, a third motion vector detection unit 109_3, and a fourth motion vector detection unit 109_4.

The video signal readout from the buffer 100 is supplied to an input terminal of the tile dividing unit 109_0 in the motion vector detection unit 109, and thus the tile dividing unit 109_0 divides the video signal of one picture into a plurality of tiles for enhancing the parallel processing capability according to tile dividing information of the HEVC standard supplied from the coding control unit which is not shown in the drawing. As a result, a first tile video image signal generated in the tile dividing unit 190_0 is supplied to one input terminal of the first motion vector detection unit 109_1, and a second tile video signal generated in the tile dividing unit 109_0 is supplied to one input terminal of the second motion vector detection unit 109_2. Since the reference image read out from the frame memory 108 is supplied in parallel to the other input terminal of the first motion vector detection unit 109_1 and the other input terminal of the second motion vector detection unit 109_2, a first motion vector MV1 is generated in the first motion vector detection unit 109_1 and a second motion vector MV2 is generated in parallel in the second motion vector detection unit 109_2. A third tile video signal generated in the tile dividing unit 109_0 is supplied to one input terminal of the third motion vector detection unit 109_3, and a fourth tile video signal generated in the tile dividing unit 109_0 is supplied to one input terminal of the fourth motion vector detection unit 109_4. Since the reference image read out from the frame memory 108 is supplied in parallel to the other input terminal of the third motion vector detection unit 109_3 and the other input terminal of the fourth motion vector detection unit 109_4, a third motion vector MV3 is generated in the third motion vector detection unit 109_3 and a fourth motion vector MV4 is generated in parallel in the fourth motion vector detection unit 109_4.

As shown in FIG. 2, the motion compensation unit 110 includes a first motion compensation unit 110_1, a second motion compensation unit 110_2, a third motion compensation unit 110_3, and a fourth motion compensation unit 110_4. The first motion vector MV1 generated in the first motion vector detection unit 109_1 is supplied to one input terminal of the first motion compensation unit 110_1, and the second motion vector MV2 generated in the second motion vector detection unit 109_2 is supplied to one input terminal of the second motion compensation unit 110_2. Since the reference image readout from the frame memory 108 is supplied in parallel to the other input terminal of the first motion compensation unit 110_1 and the other input terminal of the second motion compensation unit 110_2, a first motion compensation prediction signal is generated in the first motion compensation unit 110_1 and a second motion compensation prediction signal is generated in parallel in the second motion compensation unit 110_2. The third motion vector MV3 generated in the third motion vector detection unit 109_3 is supplied to one input terminal of the third motion compensation unit 110_3, and the fourth motion vector MV4 generated in the fourth motion vector detection unit 109_4 is supplied to one input terminal of the fourth motion compensation unit 110_4. Since the reference image read out from the frame memory 108 is supplied in parallel to the other input terminal of the third motion compensation unit 110_3 and the other input terminal of the fourth motion compensation unit 110_4, a third motion compensation prediction signal is generated in the third motion compensation unit 110_3 and a fourth motion compensation prediction signal is generated in parallel in the fourth motion compensation unit 110_4. The first motion compensation prediction signal, the second motion compensation prediction signal, the third motion compensation prediction signal, and the fourth motion compensation prediction signal generated in parallel in the first motion compensation unit 110_1, the second motion compensation unit 110_2, the third motion compensation unit 110_3, and the fourth motion compensation unit 110_4 of the motion compensation unit 110 shown in FIG. 2 in this manner are supplied to one input terminal of the selector unit 113 in parallel.

In the video encoder 1 shown in FIG. 1 and FIG. 2 according to the first embodiment, the reference image stored in the frame memory 108 is divided by tile division completely the same as the tile division for the video signal to be coded by the tile dividing unit 109_0. As a result, a tile boundary line in the tile division by the tile dividing unit 109_0 for the video signal to be coded perfectly coincides with the tile boundary line in the tile division of the reference image stored in the frame memory 108. Accordingly, in the motion vector detection unit 109 shown in FIG. 2, reference image information of all the tiles such as first, second, third, and fourth tiles included in a screen of the reference image stored in the frame memory 108 is supplied in parallel to the first, second, third, and fourth motion vector detection units 109_1, 109_2, 109_3, and 109_4. Furthermore, in the motion compensation unit 110 shown in FIG. 2, the reference image information of all the tiles such as the first, second, third, and fourth tiles included in the screen of the reference image stored in the frame memory 108 is supplied in parallel to the first, second, third, and fourth motion compensation units 110_1, 110_2, 110_3, and 110_4.

As explained above, in the motion vector detection unit 109 of FIG. 2, the tile dividing unit 109_0 divides the video signal into the tiles, and the first, second, third, and fourth motion vector detection unit 109_1, 109_2, 109_3, and 109_4 executes the motion vector detection for the video image divided into four tiles by referring to the reference image information of all the tiles in the reference image stored in the frame memory 108. Accordingly, the first motion vector MV1, the second motion vector MV2, the third motion vector MV3, and the fourth motion vector MV4 are generated in parallel in the first motion vector detection unit 109_1, the second motion vector detection unit 109_2, the third motion vector detection unit 109_3, and the fourth motion vector detection unit 109_4. Furthermore, in the motion compensation unit 110 shown in FIG. 2, the first, second, third, and fourth motion compensation units 110_1, 110_2, 110_3, and 110_4 generate in parallel the first, second, third, and fourth motion compensation prediction signals through the use of the first second, third, and fourth motion vectors MV1, MV2, MV3, and MV4 and the reference image information of all the tiles in the reference image readout from the frame memory 108.

The motion vector detection unit 109 and the motion compensation unit 110 in the video encoder 1 shown in FIG. 1 and FIG. 2 according to the first embodiment have the following feature for reducing the noise or the like generated at the boundary of the tiles which are introduced in the video coding method of the standard H.265 (HEVC).

That is, when the first motion vector detection unit 109_1 codes, by the inter prediction, the video signal positioned on or in the vicinity of the tile boundary between the first tile and another tile among the many video signals included in the first tile, the first motion vector detection unit 109_1 is constituted so as to preferentially select the reference image included in any other tiles such as the second, third, and fourth tiles. As a result, the direction of the first motion vector MV1 generated in the first motion vector detection unit 109_1 is preferentially selected in a direction going from the first tile to another tile. Accordingly, the first motion compensation prediction signal generated in the first motion compensation unit 110_1 for inter-predicting the video signal positioned on or in the vicinity of the tile boundary in the first tile preferentially includes the reference image included in any other tiles such as the second, third, and fourth tiles. Here, the vicinity of the tile boundary means being positioned on the tile boundary at a smaller distance than the largest coding unit (LCU) having a size of 64×64 pixels defined by the standard H.265 (HEVC).

When the second motion vector detection unit 109_2 codes, by the inter prediction, the video signal positioned on or in the vicinity of the tile boundary between the second tile and another tile among the many video signals included in the second tile, the second motion vector detection unit 109_2 is configured so as to preferentially select the reference image included in any other tiles such as the first, third, and fourth tiles. As a result, the direction of the second motion vector MV2 generated in the second motion vector detection unit 109_2 is preferentially selected in a direction going from the second tile to another tile. Accordingly, the second motion compensation prediction signal generated in the second motion compensation unit 110_2 for inter-predicting the video signal positioned on or in the vicinity of the tile boundary in the second tile includes the reference image included in any other tiles such as the first, third, and fourth tiles. Meanwhile, the vicinity of the tile boundary is defined by the above described standard.

When the third motion vector detection unit 109_3 performs coding, by inter prediction, on the video signal positioned on or in the vicinity of the tile boundary between the third tile and another tile among the many video signals included in the third tile, the third motion vector detection unit 109_3 is configured so as to preferentially select the reference image included in any other tiles such as the first, second, and fourth tiles. As a result, the direction of the third motion vector MV3 generated in the third motion vector detection unit 109_3 is preferentially selected in a direction from the third tile to another tile. Accordingly, the third motion compensation prediction signal generated in the third motion compensation unit 110_3 for inter-predicting the video signal positioned on or in the vicinity of the tile boundary in the third tile includes the reference image included in any other tiles such as the first, second, and fourth tiles. Meanwhile, the vicinity of the tile boundary is defined by the above described standard.

When the fourth motion vector detection unit 109_4 performs coding, by inter prediction, on the video signal positioned on or in the vicinity of the tile boundary between the fourth tile and another tile among the many video signals included in the fourth tile, the fourth motion vector detection unit 109_4 is configured so as to preferentially select the reference image included in any other tiles such as the first, second, and third tiles. As a result, the direction of the fourth motion vector MV4 generated in the fourth motion vector detection unit 109_4 is preferentially selected in a direction from the fourth tile to another tile. Accordingly, the fourth motion compensation prediction signal generated in the fourth motion compensation unit 110_4 for inter-predicting the video signal positioned on or in the vicinity of the tile boundary in the fourth tile includes the reference image included in any other tiles such as the first, second, and third tiles. Meanwhile, the vicinity of the tile boundary is defined by the above described standard.

Accordingly, the video encoder 1 shown in FIG. 1 and FIG. 2 according to the first embodiment, when coding, by the inter prediction, the video signal positioned on or in the vicinity of the tile boundary between the tiles, preferentially selects and refers to the reference image included in another tile across the tile boundary according to the above feature. As a result, the difference of video quality across the tile boundary is reduced, and it becomes possible to reduce the noise or the like generated on or in the vicinity of the boundary between the tiles which are introduced in the video coding method of the standard H.265 (HEVC).

<<Configuration of the First Motion Vector Detection Unit>>

FIG. 3 is a diagram showing a configuration of the first motion vector detection unit 109_1 of the motion vector detection unit 109 shown in FIG. 2 according to the first embodiment.

As shown in FIG. 3, the first motion vector detection unit 109_1 includes a data separation unit 109_1_1, an absolute value calculation unit 109_1_2, a tile determination unit 109_1_3, an addition unit 109_1_4, an optimum block determination unit 109_1_5, and an optimum location storage unit 109_1_6.

To the data separation unit 109_1_1, the tile dividing information TDI supplied from the coding control unit which is not shown in the drawing, pixel information and an in-screen address of a coding target block T_B, and the pixel information and the in-screen addresses of reference blocks R_B are supplied. The coding target block T_B is the coding unit (CU) which is to be inter-coded and included in the video signal of the first tile generated in the tile dividing unit 109_0, and the reference blocks R_B are many reference blocks which are included in the reference image read out from the frame memory 108 and each of which has a block size corresponding to that of the above coding unit (CU) to be inter-coded. These reference blocks R_B which are the many reference blocks include reference image information of all the tiles such as the first, second, third, and fourth tiles included in the screen of the reference image stored in the frame memory 108.

The pixel information of the coding target block T_B and the pixel information of the many reference blocks R_B are supplied to the absolute value calculation unit 109_1_2 from the data separation unit 109_1_1, and the absolute value calculation unit 109_1_2 sequentially calculates absolute values of differences Sim_V between the pixel information of the coding target block T_B and the pixel information sets of the many reference blocks R_B. The pixel information of the reference block R_B having a small absolute value of this difference Sim_V is similar to the pixel information of the coding target block T_B. Meanwhile, each of the pixel information of the coding target block T_B and the pixel information sets of the many reference blocks R_B includes the brightness signal Y and the color difference signals Cr and Cb in a ratio of 4:2:0, for example.

The tile dividing information TDI, the in-screen address of the coding target block T_B, and the in-screen addresses of the many reference blocks R_B are supplied to the tile determination unit 109_1_3 from the data separation unit 109_1_1, and the tile determination unit 109_1_3 determines whether or not the tile including the coding target block T_B and a tile including each block of the many reference blocks R_B are the same as each other. When the tiles are the same, the tile determination unit 109_1_3 generates a weight coefficient value Wg_V having a large absolute value, and when the tiles are not the same, the tile determination unit 109_1_3 generates the weight coefficient value Wg_V having a small absolute value.

The addition unit 109_1_4 executes addition of the absolute value of the difference Sim_V generated in the absolute value calculation unit 109_1_2 and the weight coefficient value Wg_V generated in the tile determination unit 109_1_3, and thus an addition result of the addition unit 109_1_4 is supplied to the optimum block determination unit 109_1_5. The optimum block determination unit 109_1_5 updates the addition result of the smallest value in response to the addition result sequentially supplied from the addition unit 109_1_4. In response to the update of the smallest value of the addition result in the optimum block determination unit, the in-screen address of the reference block corresponding to the addition result of the smallest value is updated and stored in the optimum location storage unit 109_1_6. Accordingly, the first motion vector MV1 is generated in the optimum block determination unit 109_1_5 through the use of the in-screen address of the optimum reference block R_B having the smallest addition value updated by the optimum block determination unit 109_1_5 and the in-screen address of the coding target block T_B. As a result, the direction of the first motion vector MV1 generated in the first motion vector detection unit 109_1 is preferentially selected to be in the direction from the first tile to another tile.

Each detection unit of the second motion vector detection unit 109_2, the third motion vector detection unit 109_3, and the fourth motion vector detection unit 109_4 in the motion vector detection unit 109 shown in FIG. 2 is also configured similarly to the first motion vector detection unit 109_1 shown in FIG. 3.

<<Coding Operation by the Inter Prediction>>

Figure 4:
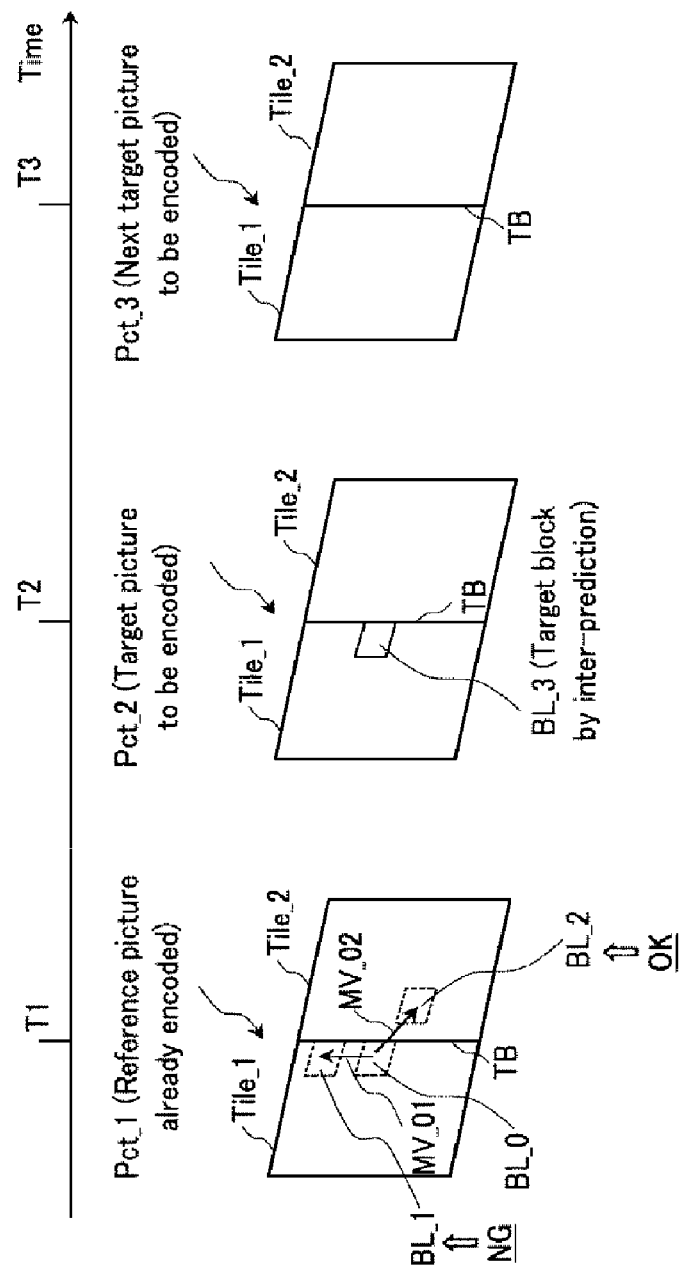
FIG. 4 is a diagram explaining coding operation by inter prediction in the video encoder 1 shown in FIGS. 1 to 3 according to a first embodiment.

FIG. 4 is a diagram explaining coding operation by the inter prediction in the video encoder 1 shown in FIG. 1 to FIG. 3 according to the first embodiment.

It is assumed that a second picture PCT_2 which is the coding target is coded by the inter prediction at the timing of second time T2 of time elapse shown in FIG. 4, in the video encoder 1 shown in FIG. 1 to FIG. 3 according to the first embodiment. The second picture Pct_2 is divided into a first tile Tile_1 and a second tile Tile_2 having a boundary at a tile boundary line TB. The second picture Pct_2 is divided into the first tile Tile_1 and the second tile Tile_2 by the tile dividing unit 109_0 of FIG. 2, and the processing for the video signal of the first tile Tile_1 by the first motion vector detection unit 109_1 and the first motion compensation unit 110_1 and the processing for the video signal of the second tile Tile_2 by the second motion vector detection unit 109_2 and the second motion compensation unit 110_2 are executed in parallel. The many video signals are included inside the first tile Tile_1, the video signal of a block BL3 is positioned on the tile boundary TB among the many video signals, and in particular, the video signal of the block BL3 positioned on the tile boundary line TB is coded by the inter prediction.

When the second picture Pct_2 is coded by the inter prediction at the timing of the second time T2, a first picture Pct_1 which is the reference image having been decoded in the local decoding processing inside the video encoder 1 is stored in the frame memory 108 at the timing of first time T1 in the time elapse shown in FIG. 4. The first picture Pct_1 which is the reference image having been decoded is also divided into the first tile Tile_1 and the second tile Tile_2 by the same tile boundary line TB the same as the tile boundary line TB in the tile division of the second picture Pct_2 which is the coding target. A block BL_0 positioned on the tile boundary line TB included in the first tile Tile_1 in the first picture Pct_1 which is the reference image has the same block size (coding unit (CU)) and the same in-screen address as the block BL3 of the inter prediction coding target included in the first tile Tile_1 of the second picture Pct_2 which is the coding target. The first tile Tile_1 of the first picture Pct_1 which is the reference image includes a reference candidate block BL1 to be used for the inter prediction for the block BL3 of the coding target, and also the second tile Tile_2 includes a reference candidate block BL2 to be used for the inter prediction for the block BL3 of the coding target. Meanwhile, each of the reference candidate blocks BL1 and BL2 has the same block size (coding unit (CU)) as the block BL3 of the coding target, the reference candidate block BL1 has the motion vector MV_01, and the reference candidate block BL2 has the motion vector MV_02.

As described above, in the video encoder 1 shown in FIG. 1 to FIG. 3 according to the first embodiment, when the video signal positioned on or in the vicinity of the tile boundary is coded by the inter prediction, the reference image included in another tile across the tile boundary is preferentially selected and referred to. Accordingly, when the video signal of the block BL3 included in the first tile Tile_1 of the second picture Pct_2 which is the coding target and positioned on the tile boundary line TB is coded by the inter prediction, the reference candidate block BL2 included in the second tile Tile_2 is selected more preferentially than the reference candidate block BL1 included in the first tile Tile_1 of the first picture Pct_1 which is the reference image. As a result, when the video signal of the block BL3 included in the first tile Tile_1 of the second picture Pct_2 and positioned on the tile boundary line TB is coded by the inter prediction, the reference image of the reference candidate block BL2 included in the second tile Tile_2 which is another tile across the tile boundary line TB is preferentially selected and referred to. Accordingly, when the video signal of the block BL3 which is included in the first tile Tile_1 of the second picture Pct_2 and which is positioned on the tile boundary line TB is coded by the inter prediction, the image quality difference between the first tile Tile_1 and the second tile Tile_2 at the tile boundary line TB is reduced, and it becomes possible to reduce the noise or the like generated in the block BL3 positioned on the tile boundary line TB.

Meanwhile, at the timing of third time T3 in the time elapse shown in FIG. 4, when a third picture Pict_3 which is the coding target is coded by the inter prediction, any one of the first picture Pct_1 and the second picture Pict_2 can be used as the reference image. At this time, when the video image positioned on the tile boundary of the third picture Pct_3 is coded by the inter prediction, the reference image included in another tile across the tile boundary is preferentially selected and referred to.

<<Coding Target Block Included in LCU>>

Figure 5:
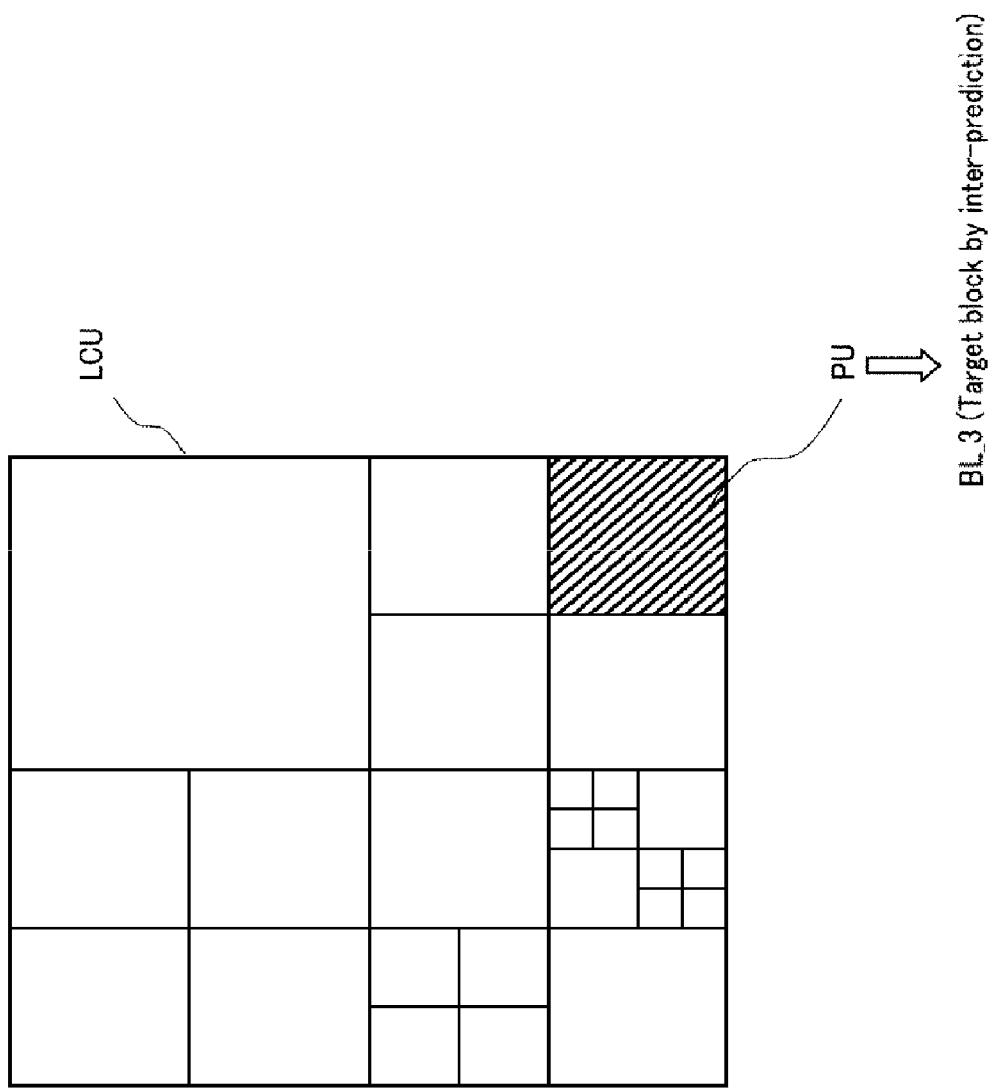
FIG. 5 is a diagram showing that a block BL3 positioned on a tile boundary line TB included in the first tile Tile_1 of the second picture Pct_2 which is a coding target in FIG. 4 is a prediction unit (PU) generated by division based on a quadtree of the largest coding unit (LCU) defined by the standard H.265 (HEVC)

FIG. 5 is a diagram showing that the block BL3 positioned on the tile boundary line TB included in the first tile Tile_1 of the second picture Pict_2 of the coding target in FIG. 4 is the prediction unit (PU) generated by the division based on the quadtree from the largest coding unit (LCU) defined by the standard H.265 (HEVC).

Accordingly, the size of the block BL3 of the coding target which is the prediction unit (PU) can be set to any size from the largest size of 64×64 pixels down to the size of a preliminarily specified smallest coding unit (CU).

<<Tile Division>>

Figure 6:
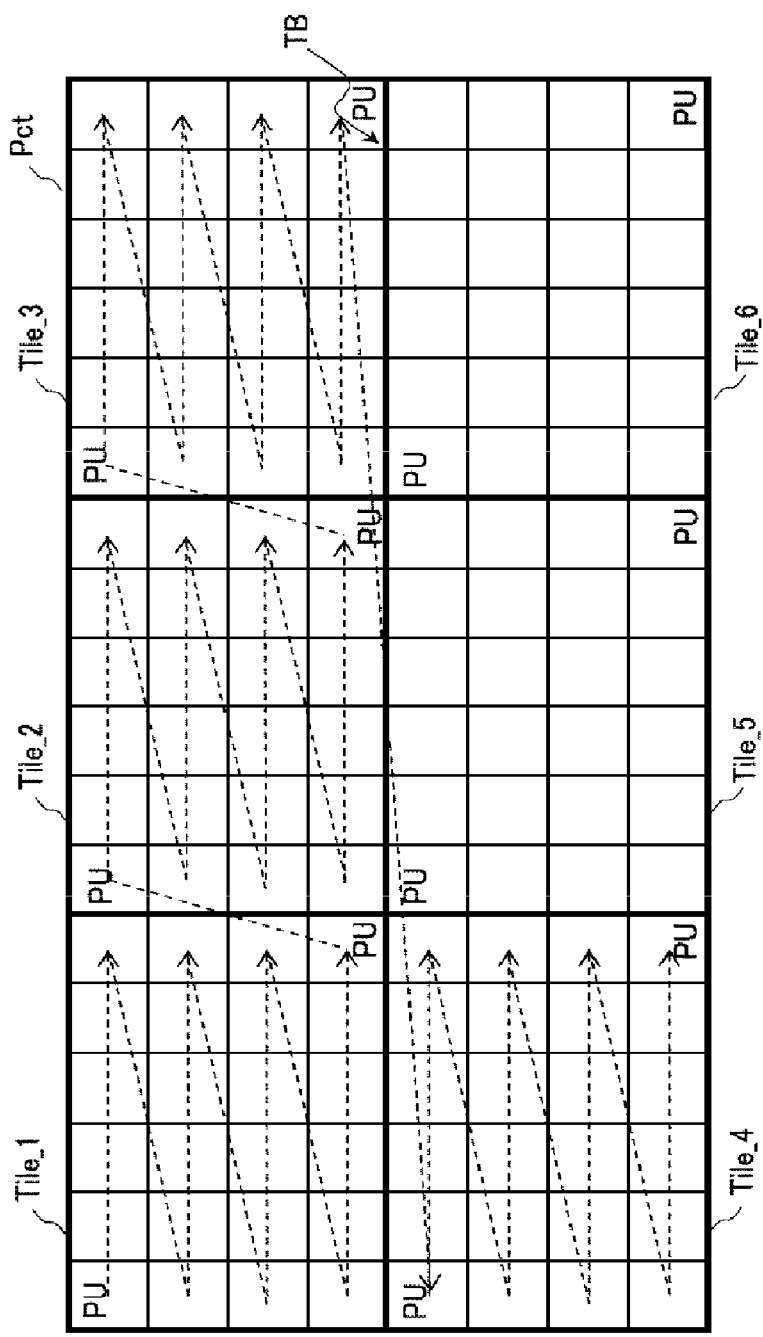
FIG. 6 is a diagram showing tile division for a picture Pct of a coding target which is subjected to parallel processing by the first, second, third, and fourth motion vector detection units 109_1, 109_2, 109_3 and 109_4 of the motion vector detection unit 109 and the first, second, third, and fourth motion compensation units 110_1, 110_2, 110_3, and 110_4 of the motion compensation unit 110 shown in FIG. 2 according to a first embodiment.

FIG. 6 is a diagram showing tile division of the picture Pct of the coding target which is subjected to parallel processing by the first, second, third, and fourth motion vector detection units 109_1, 109_2, 109_3, and 109_4 in the motion vector detection unit 109 and the first, second, third, and fourth motion compensation units 110_1, 110_2, 110_3, and 110_4 in the motion compensation unit 110 shown in FIG. 2 according to the first embodiment.

The picture Pct of the coding target shown in FIG. 6 has a ultra high resolution screen in which 4096 pixels and 2048 pixels are arranged in, for example, the horizontal and vertical directions, respectively. As described above, the tile introduced in the HEVC standard for enhancing the parallel processing capability is formed by the dividing of the picture of the coding target into rectangular areas, and the picture Pct shown in FIG. 6 includes a plurality of tiles Tile_1, 2, 3, 4, . . . which are divided by the tile boundary lines TB.

Each tile of the tiles Tile_1, 2, 3, 4 . . . includes the prediction units (PU) of the coding target blocks included in the largest coding unit (LOU) shown in FIG. 5.

The prediction units (PU) included in the first tile Tile_1 are processed by the first motion vector detection unit 109_1 and the first motion compensation unit 110_1 shown in FIG. 2, and, in parallel, the prediction units (PU) included in the second tile Tile_2 are processed by the second motion vector detection unit 109_2 and the second motion compensation unit 110_2 shown in FIG. 2. In parallel to the above processing, the prediction units (PU) included in the third tile Tile_3 are processed by the third motion vector detection unit 109_3 and the third motion compensation unit 110_3 shown in FIG. 2, and the prediction units (PU) included in the fourth tile Tile_4 are processed by the fourth motion vector detection unit 109_4 and the fourth motion compensation unit 110_4 shown in FIG. 2. The prediction units (PU) inside each tile of the tiles Tile_1, 2, 3, 4, . . . are processed in a zigzag manner in order of raster scan as shown by the broken line in FIG. 6.

After that, in the picture Pct of the coding target shown in FIG. 6, the prediction units (PU) included in a fifth tile Tile_5 are processed by the first motion vector detection unit 109_1 and the first motion compensation unit 110_1 shown in FIG. 2. In parallel to the above, the prediction units (PU) included in a sixth tile Tile_6 are processed by the second motion vector detection unit 109_2 and the second motion compensation unit 110_2 shown in FIG. 2. In parallel to the above, while not shown in FIG. 6, the prediction units (PU) included in a seventh tile Tile_7 are processed by the third motion vector detection unit 109_3 and the third motion compensation unit 110_3 shown in FIG. 2. In parallel to the above, while not shown in FIG. 6, the prediction units (PU) included in an eighth tile Tile_8 are processed by the fourth motion vector detection unit 109_4 and the fourth motion compensation unit 110_4 shown in FIG. 2.

<<Coding of the Video Signal Positioned on the Tile Boundary Line>>

Figure 7:
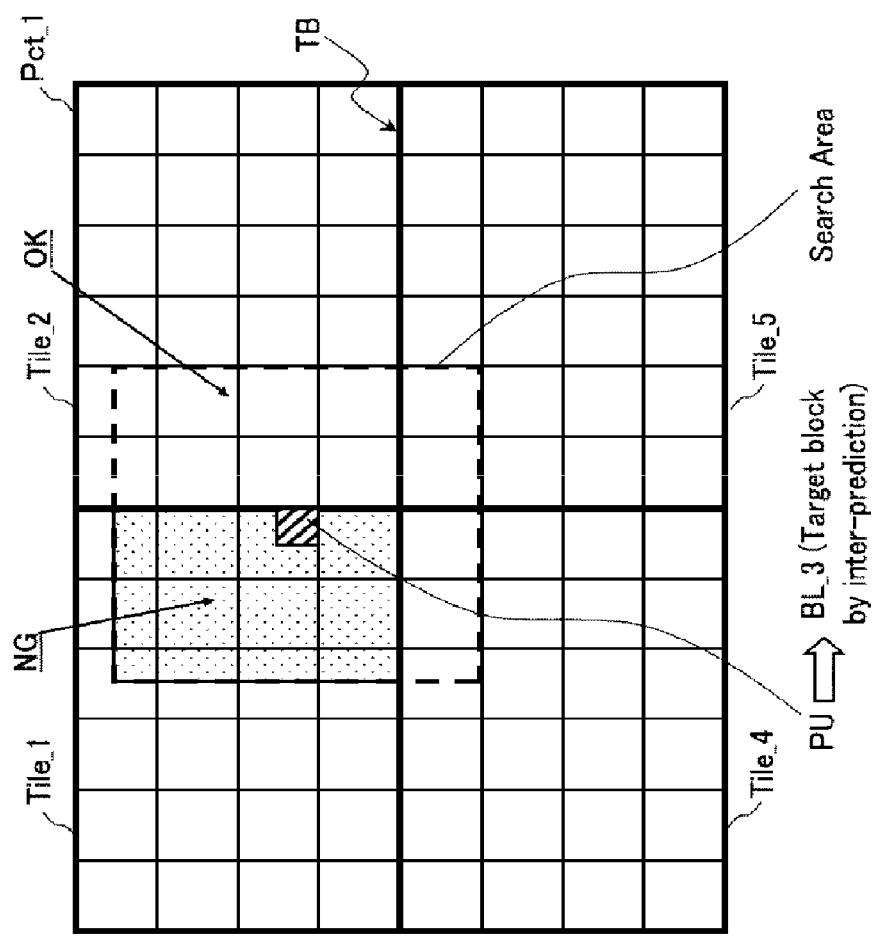
FIG. 7 is a diagram showing a search area Search Area inside a first picture Pct_1 of a reference image stored in a frame memory 108 when a prediction unit (PU) as a video signal positioned on a tile boundary line TB is coded by inter prediction among the many prediction units (PU) included in the first tile Tile_1 shown in FIG. 6.

FIG. 7 is a diagram showing a search area Search Area inside the first picture Pct_1 of the reference image stored in the frame memory 108 when the prediction unit (PU) is coded by the inter prediction as the video signal positioned on the tile boundary line TB among the many prediction units (PU) included in the first tile Tile_1 shown in FIG. 6.

Here, as with the second picture Pct_2 which is the coding target at the second time T2 in the time elapse shown in FIG. 4, the video signal of the block BL3 positioned on the tile boundary line TB is coded by the inter prediction among the many video signals inside the first tile Tile_1. The prediction unit (PU) as the video signal positioned on the tile boundary line TB included in the first tile Tile_1 of the first picture Pct_1 which is the reference image shown in FIG. 7 has the same block size and the same in-screen address as the block BL3, by the inter prediction, which is included in the first tile Tile_1 of the second picture Pct_2 of the coding target and is to be coded.

When the second picture Pct_2 is coded by the inter prediction, there is a possibility of using the reference images of all the tiles in the first picture Pct_1 which is the reference image stored in frame memory 108 at the first time T1 in the time elapse shown in FIG. 4. However, when the block BL3 positioned on the tile boundary line TB is coded by the inter prediction, if the reference images of all the tiles in the first picture Pct_1 are used, the motion vector detection time in the second motion vector detection unit 109_2 becomes long. For solving this problem, the motion vector detection is executed through the use of the search area Search Area shown in FIG. 7. That is, as shown in FIG. 7, the search area Search Area shown by the bold broken line is set in the peripheral part of the prediction unit (PU) which is the reference image having the same block size and the same in-screen address as the block BL3 to be coded by the inter prediction. In an example of FIG. 7, the search area Search Area is set in a range of ±128 pixels in the peripheral of the prediction unit (PU) which is the reference image.

However, all the reference images in the search area Search Area are not used for the coding by the inter prediction, and the tile different from the tile of the coding target is selected more preferentially than the tile the same as the tile of the coding target. Accordingly, as shown in FIG. 7, when the video signal of the block BL3 included in the first tile Tile_1 of the second picture Pict_2 of the coding target and positioned on the tile boundary line TB is coded by the inter prediction, the reference candidate block of another tile is selected more preferentially than the reference candidate block included in the first tile Tile_1 of the first picture Pict_1 which is the reference image. As a result, when the video signal of the block BL3 included in the first tile Tile_1 of the second picture Pict_2 of the coding target and positioned on the tile boundary line TB is coded by the inter prediction, the reference image of the reference candidate block included in the second, fourth, and fifth tiles Tile_2, 4, and 5 which are the other tiles is preferentially selected and referred to across the tile boundary line TB.

<<Processing Flow>>

Figure 8:
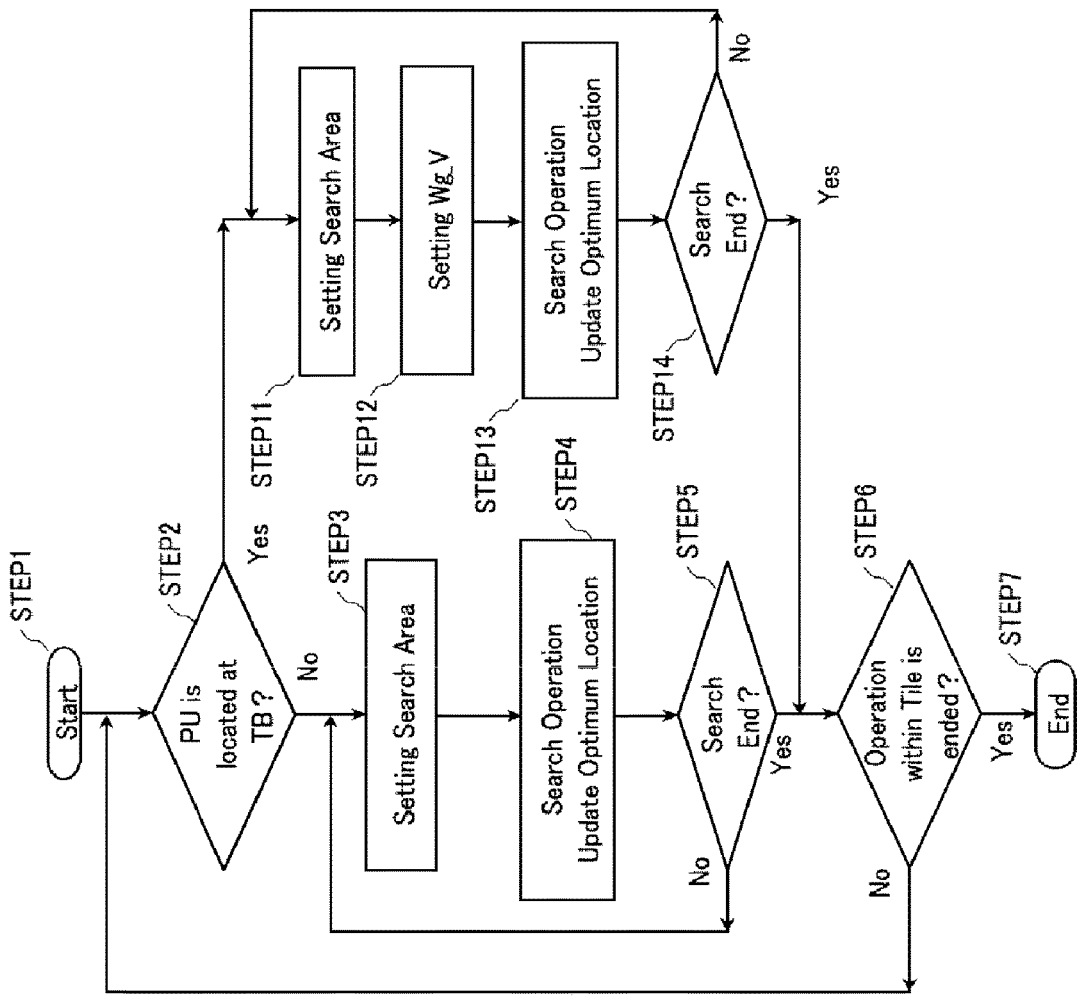
FIG. 8 is a diagram explaining a processing flow of preferentially selecting and referring to a reference image included in another tile across a tile boundary when the video encoder 1 shown in FIGS. 1 to 3 according to a first embodiment codes a video signal positioned on the tile boundary by inter prediction.

FIG. 8 is a diagram explaining processing flow of preferentially selecting and referring to a reference image included in another tile across the tile boundary, when the video encoder 1 shown in FIG. 1 to FIG. 3 according to the first embodiment codes, by the inter prediction, the video signal positioned on the tile boundary.

In first step STEP 1 shown in FIG. 8, the coding processing, by the inter prediction, for the second picture Pct_2 which is the coding target is started.

In step STEP 2, the data separation unit 109_1_1 of the first motion vector detection unit 109_1 determines whether or not each of the prediction units (PU) as the video signals included in the first tile Tile_1 of the second picture Pct_2 which is the coding target is positioned on the tile boundary line TB which divides the second picture Pct_2 into the tiles. When this determination result is "NO", the flow goes to step STEP 3, whereas, when this determination result is "YES", the flow goes to step STEP 11.

In step STEP 3, the search area Search Area is set in the range of ±128 pixels in the peripheral of the prediction unit (PU) included inside the first tile Tile_1 of the first picture Pct_1 which is the reference image.

In step STEP 4, the optimum reference block having the smallest addition value and the in-screen address thereof are updated inside the search area Search Area set in step STEP 3, through the use of the absolute value calculation unit 109_1_2, the addition unit 109_1_4, the optimum block determination unit 109_1_5, and the optimum location storage unit 109_1_6, in the first motion vector detection unit 109_1 shown in FIG. 3.

In step STEP 5, it is determined whether or not the search operation in step STEP 4 has been finished in the search area Search Area set in step STEP 3. When this determination result is "NO", the flow returns to step STEP 3, and when this determination result is "YES", the flow goes to step STEP 6.

In step STEP 6, it is determined whether or not all the prediction units (PU) of the video signals included in the first tile Tile_1 of the second picture Pct_2 which is the coding target have been processed. When this determination result is "NO", the flow returns to step STEP 2, and when this determination result is "YES", the flow goes to step STEP 7.

In step STEP 11, the search area Search Area is set in the range of ±128 pixels in the peripheral of the prediction unit (PU) as the video signal which is included in the first tile Tile_1 of the first picture Pict_1 which is the reference image shown in FIG. 7 and positioned on the tile boundary line TB, and, after that, the flow goes to step STEP 12.

In step STEP 12, the weight coefficient value Wg_V is set by the tile determination unit 109_1_3 of the first motion vector detection unit 109_1 in the motion vector detection unit 109 shown in FIG. 3. As described above, the tile determination unit 109_1_3 determines whether or not the tile including the coding target block is the same as the tile including each block of the many reference blocks. The tile determination unit 109_1_3 sets the weight coefficient value Wg_V having a large absolute value when the tiles are the same, and sets the weight coefficient value Wg_V having a small absolute value when the tiles are not the same.

In step STEP 13, the optimum reference block having the smallest addition value and the in-screen address thereof are updated in the search area Search Area set in step STEP 11, through the use of the absolute value calculation unit 109_1_2, the addition unit 109_1_4, the optimum block determination unit 109_1_5, and the optimum location storage unit 109_1_6 of the first motion vector detection unit 109_1 shown in FIG. 3. As a result, when the prediction unit (PU) of the coding target is included in the first tile Tile_1 and positioned on the tile boundary line TB, the reference image included in another tile is preferentially selected and referred to across the tile boundary line TB.

In step STEP 14, it is determined whether or not the search operation of step STEP 13 has been finished in the search area Search Area set in step STEP 11. When the determination result is "NO", the flow returns to step STEP 11, and when the determination result is "YES", the flow goes to step STEP 6.

As described above, according to the coding processing shown in FIG. 8, the coding by the inter prediction, using the reference image stored in the frame memory 108 is made possible in both cases where the prediction unit (PU) of the coding target is included completely inside the first tile Tile_1 and where the prediction unit (PU) of the coding target is included in the first tile Tile_1 and positioned on the tile boundary line TB. In particular, since the reference image included in another tile is preferentially selected and referred to across the tile boundary line TB in the latter case, the difference in the video image quality across the tile boundary is reduced, and it becomes possible to reduce the noise or the like generated at the boundary of the tiles which are introduced in the video coding method of the standard H.265 (HEVC).

[Second Embodiment]

The video encoder 1 according to the first embodiment generates the motion vector and the motion compensation prediction signal in an integer-pixel accuracy and executes the coding by the inter prediction.

On the other hand, a second embodiment to be explained in the following generates the motion vector and the motion compensation prediction signal in a fractional pixel accuracy and executes the coding by the inter prediction.

That is, since the probability that the size of the motion vector for the prediction unit (PU) in the video signal to be coded by the inter prediction has an integer pixel unit is not high, it is effective to detect the size of the motion vector in an accuracy smaller than an integer pixel (fractional pixel accuracy). Accordingly, it is necessary to generate the pixel value at a fractional pixel accuracy position from the pixel value at an integer pixel position, and thus it is necessary to use a filter having a plurality of taps for performing interpolation of a pixel value between the integer pixel positions.

<<Interpolation Filter Realizing the Fractional Pixel Accuracy>>

Figure 9:
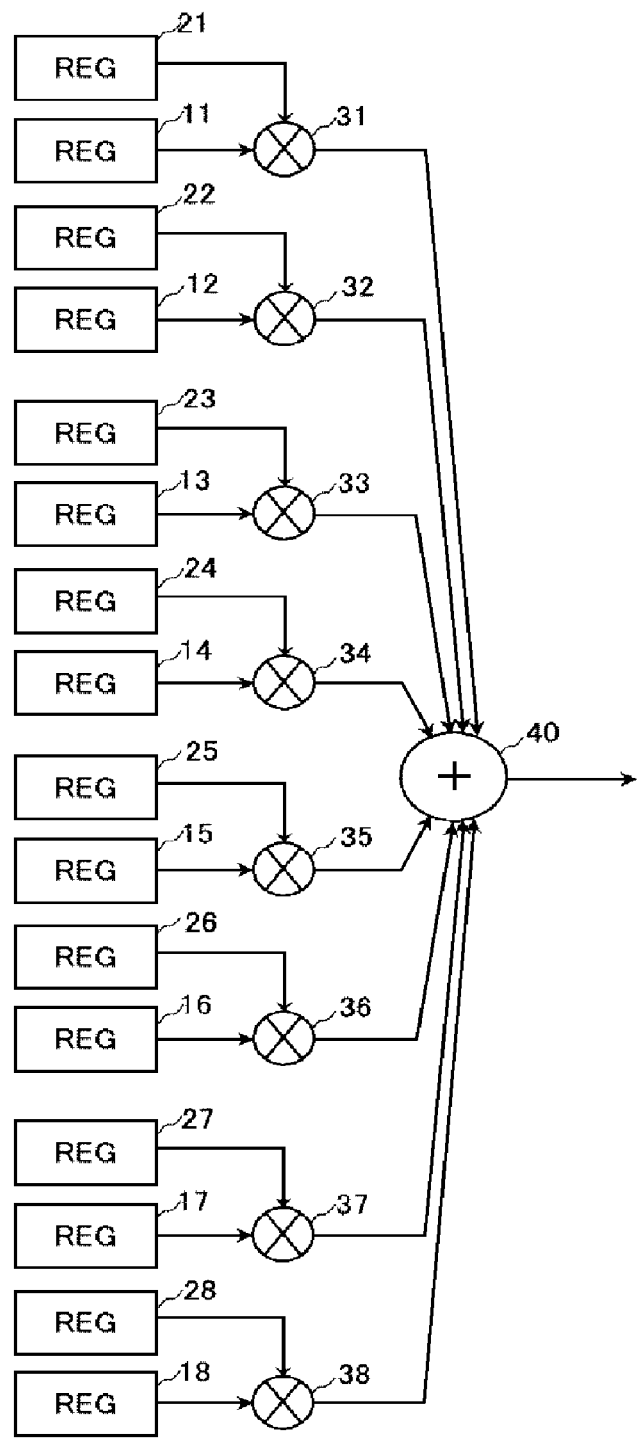
FIG. 9 is a diagram showing a configuration of an interpolation filter for the first, second, third, and fourth motion vector detection units 109_1, 109_2, 109_3, and 109_4 to detect motion vectors in a fractional pixel accuracy and for the first, second, third, and fourth motion compensation units 110_1, 110_2, 110_3, and 110_4 to generate motion compensation prediction signals in the fractional pixel accuracy, in the motion vector detection unit 109 and the motion compensation unit 110 shown in FIG. 2.

FIG. 9 is a diagram showing a configuration of an interpolation filter for the first, second, third, and fourth motion vector detection units 109_1, 109_2, 109_3, and 109_4 to detect motion vectors in the fractional pixel accuracy and, for the first, second, third, and fourth motion compensation units 110_1, 110_2, 110_3, and 110_4 to generate the motion compensation prediction signals in the fractional pixel accuracy, in the motion vector detection unit 109 and the motion compensation unit 110 shown in FIG. 2.

As shown in FIG. 9, the interpolation filter is constituted of a digital filter having eight taps. Accordingly, the digital filter having eight taps as the interpolation filter shown in FIG. 9 includes eight pixel registers 11, 12, . . . 18 which store the pixel values at eight integer pixel positions, eight tap coefficient registers 21, 22, . . . 28 which store eight tap coefficients, eight digital multipliers 31, 32, . . . , 38, and an adder 40.

A first pixel value at a first integer pixel position stored in the first pixel register 11 and a first tap coefficient stored in the first tap coefficient register 21 are multiplied together by the first digital multiplier 31, and the multiplication result of the first digital multiplier 31 is supplied to a first input terminal of the adder 40.

A second pixel value at a second integer pixel position stored in the second pixel register 12 and a second tap coefficient stored in the second tap coefficient register 22 are multiplied together by the second digital multiplier 32, and the multiplication result of the second digital multiplier 32 is supplied to a second input terminal of the adder 40.

Hereinafter, in the same manner, an eighth pixel value at an eighth integer pixel position stored in the eighth pixel register 18 and an eighth tap coefficient stored in the eighth tap coefficient register 28 are multiplied together by the eighth digital multiplier 38, and the multiplication result of the eighth digital multiplier 38 is supplied to an eighth input terminal of the adder 40.

In this manner, the adder 40 adds each of the multiplication results of the eight digital multipliers 31, 32, . . . 38, and thus generates an output signal showing the pixel value at the fractional pixel accuracy position.

<<Operation of the Interpolation Filter>>

Figure 10:
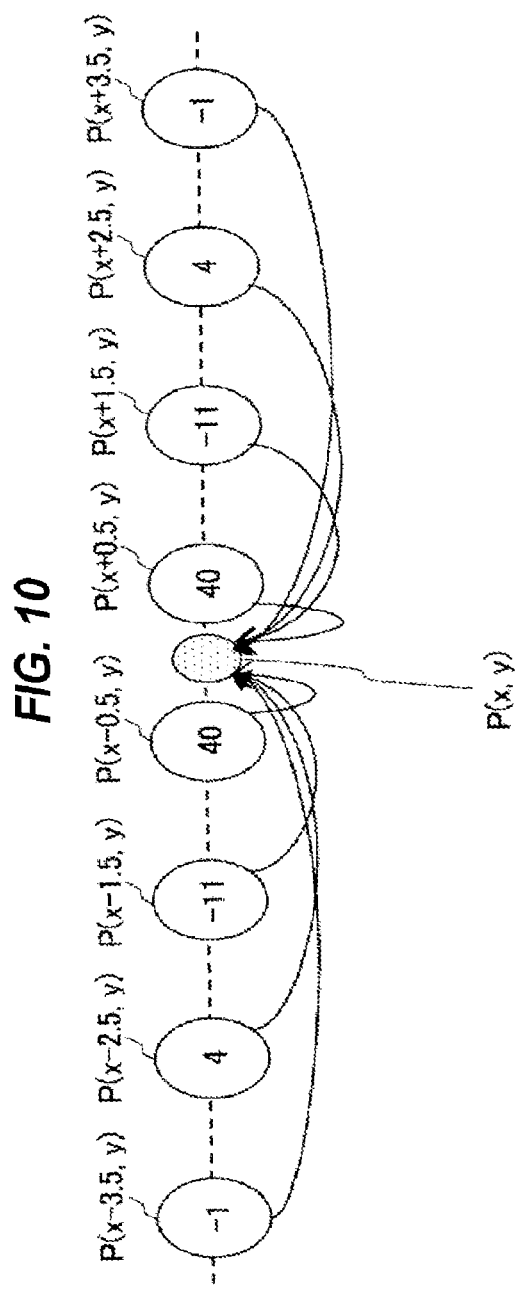
FIG. 10 is a diagram explaining operation of the interpolation filter shown in FIG. 9 for generating a pixel value at a fractional pixel accuracy position according to a second embodiment.

FIG. 10 is a diagram explaining operation of the interpolation filter, shown in FIG. 9, for generating the pixel value at the fractional pixel accuracy position according to the second embodiment.

As shown in FIG. 10, the first pixel value (P(x−3.5, y)) at the first integer pixel position stored in the first pixel register 11 and the first tap coefficient (−1) stored in the first tap coefficient register 21 are multiplied together by the first digital multiplier 31.

The second pixel value (P(x−2.5, y)) at the second integer pixel position stored in the second pixel register 12 and the second tap coefficient (4) stored in the second tap coefficient register 22 are multiplied together by the second digital multiplier 32.

The third pixel value (2(x−1.5, y)) at the third integer pixel position stored in the third pixel register 13 and the third tap coefficient (−11) stored in the third tap coefficient register 23 are multiplied together by the third digital multiplier 33.

The fourth pixel value (P(x−0.5, y)) at the fourth integer pixel position stored in the fourth pixel register 14 and the fourth tap coefficient (40) stored in the fourth tap coefficient register 24 are multiplied together by the fourth digital multiplier 34.

The fifth pixel value (P(x+0.5, y)) at the fifth integer pixel position stored in the fifth pixel register 15 and the fifth tap coefficient (40) stored in the fifth tap coefficient register 25 are multiplied together by the fifth digital multiplier 35.

The sixth pixel value (P(x+1.5, y)) at the sixth integer pixel position stored in the sixth pixel register 16 and the sixth tap coefficient (−11) stored in the sixth tap coefficient register 26 are multiplied together by the sixth digital multiplier 36.

The seventh pixel value (P(x+2.5, y)) at the seventh integer pixel position stored in the seventh pixel register 17 and the seventh tap coefficient (4) stored in the seventh tap coefficient register 27 are multiplied together by the seventh digital multiplier 37.

The eighth pixel value (P(x+3.5, y)) at the eighth integer pixel position stored in the eighth pixel register 18 and the eighth tap coefficient (−1) stored in the eighth tap coefficient register 28 are multiplied together by the eighth digital multiplier 38.

By the addition of the eight multiplication results in the eight digital multipliers 31, 32, . . . , 38 by the adder 40, it becomes possible to generate an output signal showing the pixel value (P(x, y)) at the fractional pixel accuracy position which is positioned at an intermediate position between the fourth integer pixel position and the fifth integer pixel position, from an output terminal of the adder 40.

The interpolation filter shown in FIG. 9 for generating the pixel value at the fractional pixel accuracy position according to the second embodiment is constituted by the eight tap digital filter. Accordingly, as shown in FIG. 10, the first pixel value (P(x−3.5, y)) at the first integer pixel position and the eighth pixel value (P(x+3.5, y)) at the eighth integer pixel position are disposed at 3.5 tap position on the left-hand side and at the 3.5 tap position on the right-hand side from the pixel value (P(x, y)) at the fractional pixel accuracy position positioned at an intermediate position, respectively.

The interpolation shown in FIG. 9 according to the second embodiment executes eight tap digital filter operation in the horizontal direction and then executes the eight tap digital filter operation also in the vertical direction, in an ultra-high resolution screen where 4096 pixels are arranged in the horizontal direction and 2048 pixels are arranged in the vertical direction, for example.

<<Fractional Search Area Using the Fractional Pixel Accuracy>>

Figure 11:
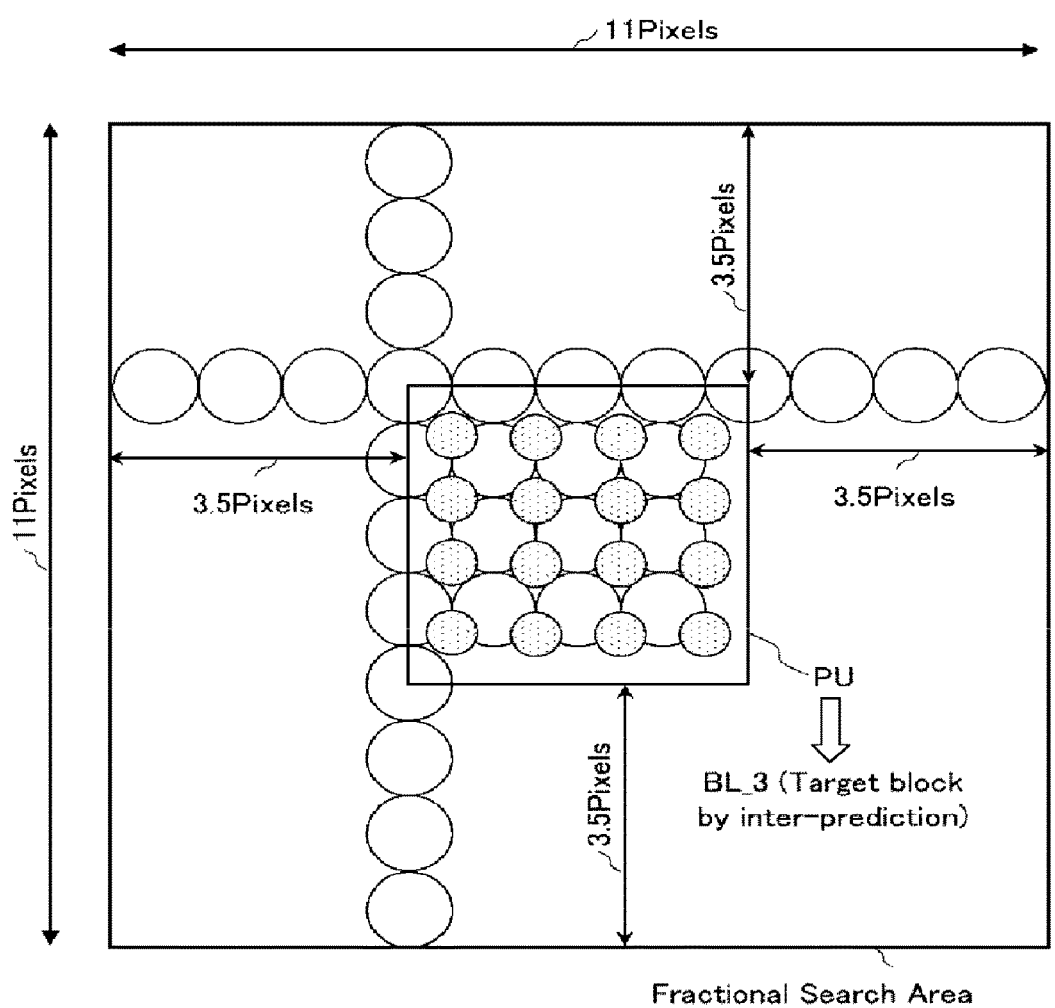
FIG. 11 is a diagram showing a fractional search area Fractional Search Area where motion vector detection and motion compensation prediction signal generation are possible by using a pixel value at a fractional pixel accuracy position generated by the interpolation filter shown in FIG. 9 according to a second embodiment, when a prediction unit (PU) of a coding target is a block BL3 and a unit for motion compensation has 4 pixels×4 pixels.

FIG. 11 is a diagram showing fractional search area Fractional Search Area where the motion vector detection and the motion compensation prediction signal generation are possible through the use of the pixel value at the fractional pixel accuracy position which is generated in the interpolation filter shown in FIG. 9 according to the second embodiment, when the prediction unit (PU) which is the coding target is the block BL3 and the unit of the motion compensation includes 4 pixels×4 pixels.

As shown in FIG. 11, the fractional search area Fractional Search Area has a size of 11 pixels×11 pixels, up and down and left and right, with the prediction unit (PU) which is the coding target having a size of 4 pixels×4 pixels, as a center. That is, 3.5 pixels exist on the left-hand side of one pixel at the left end of the prediction unit (PU) having a size of 4 pixels×4 pixels, and 3.5 pixels exist on the right-hand side of one pixel at the right end of the prediction unit (PU). Similarly, 3.5 pixels exist on the upper side of one pixel at the upper end of the prediction unit (PU) having a size of 4 pixels×4 pixels, and 3.5 pixels exist on the lower side of one pixel at the lower end of the prediction unit (PU).

FIG. 12 is a diagram showing the fractional search area Fractional Search Area where the search is possible using the pixel value at the fractional pixel accuracy position generated in the interpolation filter shown in FIG. 9 according to the second embodiment when the prediction unit (PU) which is the coding target is the block BL3 positioned on the tile boundary line TB as in FIG. 7.

FIG. 12 shows the integer pixel accuracy search area Search Area searched by the video encoder 1 according to the first embodiment, for reference. In particular, in each of the two fractional search areas Fractional Search Areas shown in FIG. 12, the pixels in a part of the 11 pixel×11 pixel size include the pixel values of the other second tile Tile_2 or fourth tile Tile_4, which is different from the first tile Tile_1 including the block BL3 which is the coding target. Accordingly, it is understood that, with reference to the reference image included in the other tiles Tile_2, 3, and 4 crossing the tile boundary line TB from the first tile Tile_1 which includes the block BL3 which is the coding target in FIG. 12, an area where the quality becomes good (OK) is expanded from the area where the quality becomes good (OK) in FIG. 7. That is, with reference to the reference image included in the same tile as the first tile Tile_1 including the block BL3 which is the coding target in FIG. 12, an area where the quality becomes bad (NG) shrinks from an area where the quality becomes bad (NG) in FIG. 7.

<<Processing Flow>>

Figure 13:
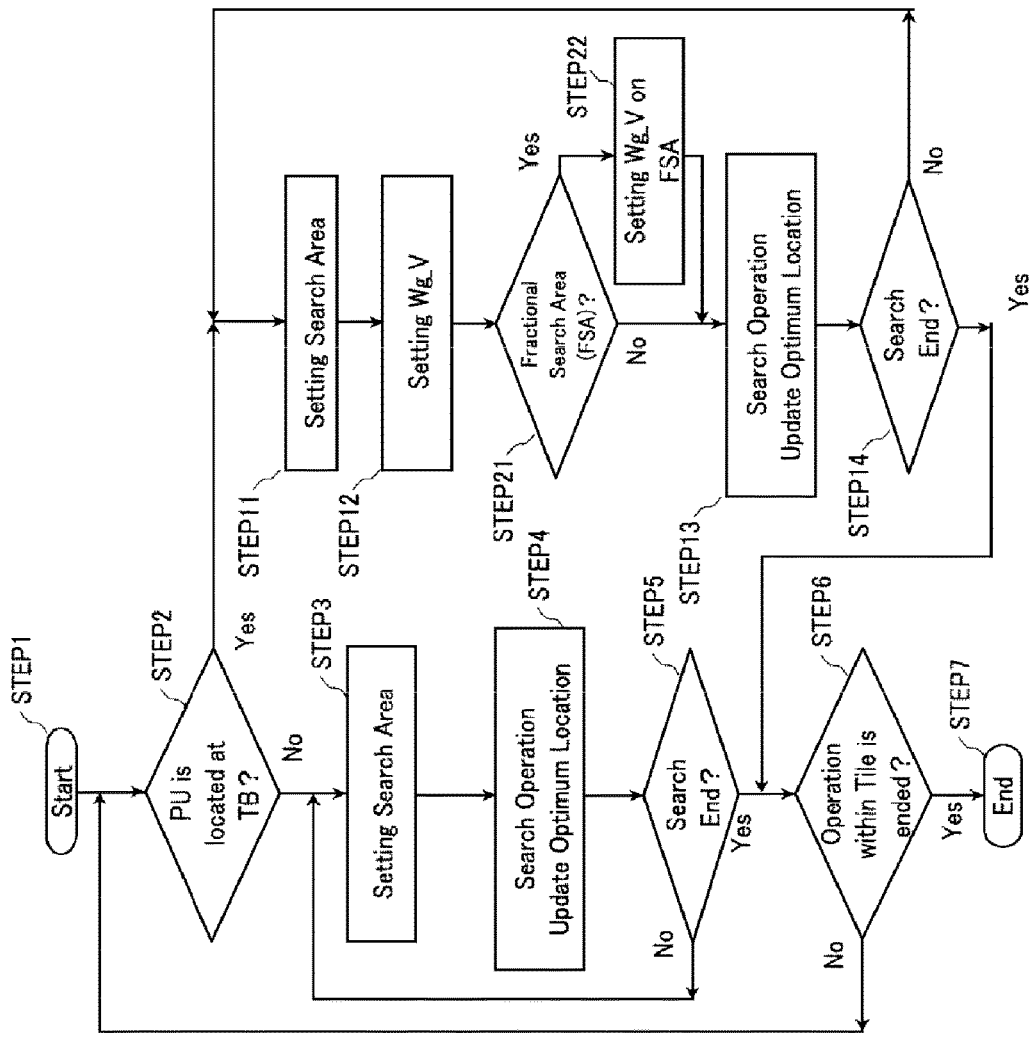
FIG. 13 is a diagram explaining a processing flow of preferentially selecting and referring to a reference image included in another tile across a tile boundary when the video encoder 1 shown in FIGS. 9 to 12 according to a second embodiment codes a video signal positioned on the tile boundary, by inter prediction.

FIG. 13 is a diagram explaining a processing flow of preferentially selecting and referring to the reference image included in another tile across the tile boundary when the video encoder 1 shown in FIG. 9 to FIG. 12 according to the second embodiment codes the video signal positioned on the tile boundary by the inter prediction.

The processing flow shown in FIG. 13 according to the second embodiment is different from the processing flow shown in FIG. 8 according to the first embodiment in that step STEP 21 and step STEP 22 are added.

In step STEP 21, it is determined whether or not the fractional search area Fractional Search Are which has a size of 11 pixels×11 pixels and is positioned at the search position includes the pixel values of the tiles across the tile boundary line TB. When this determination result is "YES", the flow goes to step STEP 22, and, when this determination result is "NO", the flow goes to step STEP 13 directly.

In step STEP 22, since the fractional search area Fractional Search Area is positioned at the tile boundary line TB, the weight coefficient value Wg_V is set to have a small value.

As a result, according to the processing flow of FIG. 13 according to the second embodiment, two fractional search area Fractional Search Areas as shown in FIG. 12 are preferentially selected.

While the invention achieved by the present inventors has been explained according to the various embodiments in the above, it is needless to say that the present invention is not limited thereto and various modifications are possible in a range without departing from the gist thereof.

For example, the present invention is not limited only to the video coding processing in accordance with the standard H.265 (HEVC).

That is, the present invention can be applied to the coding processing corresponding to a standard which will appear in the future, using, as a processing unit, the largest coding unit (LOU) having a further larger size as a processing unit, other than the standard H.265 (HEVC) using the largest coding unit (LCU) having a size of 64×64 pixels.

The present invention can be applied widely to the video coding processing in which one picture can be subjected to the parallel processing and can be divided into the tiles each including a rectangular pixel area.

What is claimed is:

1. A video coding device comprising:
a frame memory storing a reference image;
a detection unit into which a video signal included in one picture and the reference image from the frame memory are inputted, the detection unit being configured to divide the one picture into a plurality of tiles, each of the tiles being further divided into a plurality of prediction blocks based on a quadtree algorithm, the plurality of tiles including a first tile and a second tile difference from the first tile, the detection unit being further configured to generate a motion vector based on the video signal and the reference image; and
a motion compensation unit into which the motion vector and the reference image from the frame memory are inputted and which generates a motion compensation prediction signal based on the motion vector and the reference image,
wherein the detection unit generates the motion vector by searching the reference image for a reference image area that is most similar to a prediction block of the plurality of prediction blocks,
wherein when the prediction block is a coding target block included in the video signal and is positioned in the first tile on or in the vicinity of a tile boundary between the first tile and the second tile, the detection unit generates the motion vector by referring to a reference block of the reference image that is from the second tile rather than the first tile.

2. The video coding device according to claim 1,
wherein the detection unit generates the motion vector in accordance with address information of the video signal, address information of the reference image supplied to an input terminal of the detection unit, and information about the tile boundary.

3. The video coding device according to claim 2,
wherein the detection unit is configured to generate the motion vector in a fractional pixel accuracy by using an interpolation filter having a plurality of taps, and executing interpolation of a pixel value between integer pixel positions.

4. The video coding device according to claim 3, wherein the detection unit is configured to cause a fractional search area which is set in the fractional pixel accuracy for the motion vector detection to include the reference image which is included in the second tile different from the first tile, when the motion vector is generated.

5. The video coding device according to claim 4, wherein the video signal of the first tile supplied to the one input terminal of the detection unit is one of video signals of a plurality of tiles divided in accordance with a standard H.265 (HEVC).

6. The video coding device according to claim 5, wherein the vicinity of the tile boundary is at a smaller distance from the tile boundary than a largest coding unit which is defined by the standard H.265 (HEVC) and has a size of 64×64 pixels.

7. The video coding device according to claim 1, wherein the detection unit further comprises:
a tile determination unit which generates a value used for determining an optimum reference image based on the prediction block and the reference image,
wherein the tile determination unit generates a first value when the reference image is in a tile including the prediction block and generates a second value when the reference image is in a tile not including the prediction block.

8. The video coding device according to claim 7, wherein the first value is larger than the second value.

9. The video coding device according to claim 8, wherein the detection unit further comprises:
an addition unit which adds the first value or the second value to a difference signal, and outputs an addition value; and
an optimum block determination unit which selects an optimum reference block based on the addition value,
wherein the difference signal represents the difference between the prediction block and the reference image, and
wherein the optimum block determination unit selects the reference image having the smallest addition value as the optimum reference image.

10. The video coding device according to claim 9, wherein when the prediction block is not positioned on or in the vicinity of the tile boundary between the first tile and second tile, the detection unit refers to the reference image of the frame memory based only on the difference signal.

11. The video coding device according to claim 1, wherein the detection unit generates the motion vector by referring to the reference image from the second tile preferentially when the prediction block is positioned on the tile boundary between the first tile and the second tile.

12. A video coding method, comprising:
generating a motion vector based on a video signal included in a picture, and a reference image; and
generating a motion compensation prediction signal based on the motion vector and the reference image,
wherein the picture is divided into a plurality of tiles including a first tile and a second tile different from the first tile,
wherein each tile is divided into a plurality of prediction blocks based on a quadtree algorithm,
wherein the generating of the motion vector includes searching for a reference image area in the reference image that is most similar to a prediction block of the plurality of prediction blocks,
wherein when the prediction block is a coding target block included in the video signal and is positioned in the first tile on or in the vicinity of a tile boundary between the first tile and the second tile, the motion vector is generated by referring to a reference block of the reference image that is from the second tile rather than the first tile.

13. The video coding method according to claim 12, wherein the motion vector is generated in accordance with address information of the video signal, address information of the reference image, and information about the tile boundary.

14. The video coding method according to claim 13, wherein the motion vector is generated in a fractional pixel accuracy by using an interpolation filter having a plurality of taps, and executing interpolation of a pixel value between integer pixel positions.

15. The video coding method according to claim 14, further comprising setting a fractional search area in the fractional pixel accuracy, wherein the fractional search area includes the reference image which is included in the second tile different from the first tile.

16. The video coding method according to claim 15, wherein the video signal of the first tile is one of video signals of a plurality of tiles divided in accordance with a standard H.265 (HEVC).

17. The video coding method according to claim 16, wherein the vicinity of the tile boundary is at a smaller distance from the tile boundary than a largest coding unit which is defined by the standard H.265 (HEVC) and has a size of 64×64 pixels.

18. The video coding method according to claim 12, further comprising:
determining an optimum reference image by:
generating a value based on the prediction block and the reference image;
generating a first value when the reference image is in a tile including the prediction block, and generating a second value when the reference image is in a tile not including the prediction block;
adding the first value or the second value to a difference signal to obtain an addition value; and
selecting an optimum reference block based on the addition value,
wherein the difference signal represents the difference between the prediction block and the reference image, and
wherein the reference image having the smallest addition value is selected as the optimum reference image.

19. The video coding method according to claim 18, wherein the first value is larger than the second value.

20. The video coding method according to claim 18, wherein
when the prediction block is not positioned on or in the vicinity of the tile boundary between the first tile and second tile, the motion vector is generated by referring to the reference image based only on the difference signal.

21. The video coding method according to claim 12, wherein
the motion vector is generated by referring to the reference image from the second tile preferentially when the prediction block is positioned on the tile boundary between the first tile and the second tile.

* * * * *